(12) United States Patent
Franceschini et al.

(10) Patent No.: US 10,496,684 B2
(45) Date of Patent: *Dec. 3, 2019

(54) AUTOMATICALLY LINKING TEXT TO CONCEPTS IN A KNOWLEDGE BASE

(71) Applicant: International Business Machines Corporation, Armonk, NY (US)

(72) Inventors: Michele M. Franceschini, White Plains, NY (US); Luis A. Lastras-Montano, Cortlandt Manor, NY (US); Livio B. Soares, New York, NY (US); Mark N. Wegman, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,888

(22) Filed: Nov. 8, 2018

(65) Prior Publication Data

US 2019/0073415 A1    Mar. 7, 2019

Related U.S. Application Data

(63) Continuation of application No. 14/657,343, filed on Mar. 13, 2015, now Pat. No. 10,162,883, which is a
(Continued)

(51) Int. Cl.
*G06F 17/30* (2006.01)
*G06F 16/31* (2019.01)
(Continued)

(52) U.S. Cl.
CPC ........ *G06F 16/313* (2019.01); *G06F 16/3334* (2019.01); *G06F 16/3346* (2019.01);
(Continued)

(58) Field of Classification Search
USPC ...................................................... 704/7–10
See application file for complete search history.

(56) References Cited

U.S. PATENT DOCUMENTS

| 4,839,853 A | 6/1989 | Deerwester et al. |
| 7,191,175 B2 | 3/2007 | Evans et al. |
| (Continued) | | |

FOREIGN PATENT DOCUMENTS

| CN | 101169780 A | 4/2008 |
| CN | 101685455 A | 3/2010 |
| (Continued) | | |

OTHER PUBLICATIONS

D. Bonino et al., "Domain Specific Searches Using Conceptual Spectra," ictai, pp. 680-687, 16th IEEE International Conference on Tools with Artificial Intelligence (ICTAI2004), 2004; 8 pages.
(Continued)

*Primary Examiner* — Leonard Saint Cyr
(74) *Attorney, Agent, or Firm* — Cantor Colburn LP; Will Stock

(57) ABSTRACT

According to an aspect, automatically linking text to concepts in a knowledge base using differential analysis includes receiving a text string and selecting, based on contents of the text string, a plurality of data sources that correspond to concepts in the knowledge base. In a further aspect, automatically linking the text to the concepts includes calculating, for each of the selected data sources, a probability that the text string is output by a language model built using the selected data source, calculating a probability that the text string is output by a generic language model, calculating link confidence scores for each concept based on a differential analysis of the probabilities, and creating a link from the text string to one of the concepts in the knowledge base. The creating is based on a link confidence score of the
(Continued)

concept being more than a threshold value away from a prescribed threshold.

10 Claims, 22 Drawing Sheets

Related U.S. Application Data continuation of application No. 14/330,381, filed on Jul. 14, 2014, now Pat. No. 10,162,882.

(51) Int. Cl.
*G06F 16/33* (2019.01)
*G06N 5/00* (2006.01)
*G06N 5/02* (2006.01)
*G06F 17/22* (2006.01)

(52) U.S. Cl.
CPC ......... *G06F 17/2235* (2013.01); *G06N 5/003* (2013.01); *G06N 5/025* (2013.01)

(56) References Cited

U.S. PATENT DOCUMENTS

| | | |
|---|---|---|
| 7,412,442 B1 | 8/2008 | Vadon |
| 7,801,898 B1 | 9/2010 | Weissman |
| 7,827,125 B1 | 11/2010 | Rennison |
| 7,958,155 B2 | 6/2011 | Mershon et al. |
| 8,024,329 B1 | 9/2011 | Rennison |
| 8,025,329 B1 | 9/2011 | Rennison |
| 8,185,558 B1 | 5/2012 | Narayanan |
| 8,200,670 B1 | 6/2012 | Flaster et al. |
| 8,315,849 B1 | 11/2012 | Gattani |
| 8,463,810 B1 | 6/2013 | Rennison |
| 8,825,669 B2 | 9/2014 | Myaeng |
| 9,002,867 B1 | 4/2015 | Adams et al. |
| 9,536,522 B1 | 1/2017 | Hall |
| 9,576,023 B2 | 2/2017 | Franceschini |
| 9,703,858 B2 | 7/2017 | Franceschini et al. |
| 9,710,570 B2 | 7/2017 | Franceschini et al. |
| 9,734,196 B2 | 8/2017 | Franceschini et al. |
| 9,773,054 B2 | 9/2017 | Franceschini et al. |
| 9,805,139 B2 | 10/2017 | Franceschini et al. |
| 2002/0022956 A1 | 2/2002 | Ukrainczyk |
| 2002/0087309 A1 | 7/2002 | Lee |
| 2003/0018659 A1 | 1/2003 | Fuks et al. |
| 2004/0093328 A1 | 5/2004 | Damle |
| 2004/0254904 A1 | 12/2004 | Nelken |
| 2005/0022106 A1 | 1/2005 | Kawai |
| 2005/0283491 A1 | 12/2005 | Vandamme |
| 2006/0047682 A1 | 3/2006 | Black et al. |
| 2006/0106792 A1 | 5/2006 | Patterson |
| 2007/0094210 A1 | 4/2007 | Craig |
| 2007/0198506 A1 | 8/2007 | Attaran |
| 2008/0033932 A1 | 2/2008 | Delong |
| 2008/0133482 A1 | 6/2008 | Anick et al. |
| 2008/0147622 A1 | 6/2008 | Koike |
| 2008/0247313 A1 | 10/2008 | Nath et al. |
| 2009/0077062 A1 | 3/2009 | Spivack |
| 2009/0089047 A1 | 4/2009 | Pell et al. |
| 2009/0222400 A1 | 9/2009 | Kupershmidt |
| 2009/0228528 A1 | 9/2009 | Ercegovac |
| 2010/0049684 A1 | 2/2010 | Adriaansen |
| 2011/0029475 A1 | 2/2011 | Gionis |
| 2011/0196851 A1 | 8/2011 | Vadlamani |
| 2011/0307819 A1 | 12/2011 | Vadlamani |
| 2012/0078911 A1 | 3/2012 | Johnston et al. |
| 2012/0143871 A1 | 6/2012 | Liebald |
| 2012/0158636 A1 | 6/2012 | Bowers et al. |
| 2012/0179662 A1 | 7/2012 | Myaeng |
| 2012/0278102 A1 | 11/2012 | Johnson |
| 2014/0040275 A1 | 2/2014 | Dang et al. |
| 2014/0122495 A1 | 5/2014 | Kawai |
| 2014/0214825 A1 | 7/2014 | Zhang |
| 2016/0012044 A1 | 1/2016 | Franceschini et al. |
| 2016/0012057 A1 | 1/2016 | Franceschini et al. |
| 2016/0012058 A1 | 1/2016 | Franceschini et al. |
| 2016/0012106 A1 | 1/2016 | Franceschini et al. |
| 2016/0012119 A1 | 1/2016 | Franceschini et al. |
| 2016/0012122 A1 | 1/2016 | Franceschini et al. |
| 2016/0012125 A1 | 1/2016 | Franceschini et al. |
| 2016/0012126 A1 | 1/2016 | Franceschini et al. |
| 2016/0012336 A1 | 1/2016 | Franceschini et al. |
| 2017/0177714 A1 | 6/2017 | Franceschini et al. |

FOREIGN PATENT DOCUMENTS

| | | |
|---|---|---|
| CN | 103744984 A | 4/2014 |
| CN | 104182464 A | 12/2014 |
| CN | 104239513 A | 12/2014 |

OTHER PUBLICATIONS

Garner et al., "Hypothesis generation paradigm for fraud detection" In Tencon'94, IEEE Region 10's Ninth Annual International Conference. Theme: Frontiers of Computer Technology, Proccedings of 1994, pp. 197-201, IEEE, 1994.

International Search Report and Written Opionion; International Application No. PCT/IB2015/055280; International Filing Date: Jul. 13, 2015; dated Dec. 18, 2015; 13 pages.

IP.Com; "System and Method for Using Hypernym Trees to Enable Concept and Topic Based Searches," IP.com No. IPCOM000224413D; Dec. 18, 2012; 7 pages.

Rohini K. Srihari et al., "Contextual Information Retrieval using Concept Chain Graphs", ceur-ws.org 2005, 12 pages.

List of IBM Patents or Patent Applictions Treated As Related; (Appendix P), Filed Nov. 8, 2018, 2 pages.

Michele M. Franceschini et al., U.S. Appl. No. 16/183,877 entitled "Automatically Linking Text to Concepts in a Knowledge Base," filed with the U.S. Patent and Trademark Office on Nov. 8, 2018.

FIG. 3

Text Search: Mambo

302 / 304

Patrick Borrer
*Publications*
Application of full-system simulation in exploratory system design and development. Mambo: a full system simulator for the PowerPC architecture. The Design and Validation of a System Performance and Power Simulator. Mambo: Advances in PowerPC System Simulation. Full circle: Simulating Linux clusters on Linux clusters. Design and validation of a performance and power simulator for PowerPC systems...

*Profile*
...called IBM Mobile Systems Remote on Apple's App Store in March 2011. This work was a collaboration between Research and STG. System

Ram Rajamony
*Publications*
...circuit switching for high performance computing systems. Adaptive Mechanisms and Policies for Managing Cache Hierarchies in Chip Multiprocessors. Power and Energy Management for Server Systems. Mambo: a full system simulator for the PowerPC architecture. SIGMETRICS Perform. Mambo: a full system simulator for the PowerPC architecture. Energy Conservation Policies for Web Servers. Energy conservation policies for web servers. Energy-Efficient Server Clusters. On...

SPEIGHT, WILLIAM E. (Evan)
*Publications*
...Early Release of Blocked Receives. Reducing communication time through message prefetching. Adaptive Mechanisms and Policies for Managing Cache Hierarchies in Chip Multiprocessors. Runtime compression of MPI messages to improve the performance and scalability of parallel applications. Runtime Compression of MPI Messages. Raptor: Integrating Checkpoints and Thread Migration for Cluster Management. Efficient user-level simulator for the PowerPC architecture. Mambo: a full system simulator for the PowerPC architecture. Energy Conservation Policies for Web Servers. Efficient user-level thread migration and checkpointing on windows NT clusters. The Performance Value of Shared Network Caches in Clustered Multiprocessor Workstations. Working set requirements and performance of network caches in cluster-based...

Charles R Lefurgy
*Publications*
...R. Rockhold, H. Shafi, R. Simpson, E. Speight, K. Sudeep, E. Van Hensbergen, and Lixin Zhang. "Mambo - A Full System Simulator for the PowerPC Architecture", ACM SIGMETRICS Performance Evaluation Review, Volume 31, Number... R. Rockhold, H. Shafi, R. Simpson, E. Speight, K. Sudeep, E. Van Hensbergen, and Lixin Zhang. "Mambo - A Full System Simulator for the PowerPC Architecture", ACM SIGMETRICS Performance Evaluation Review, Volume 31, Number 4, March 2004. Paper. PDF Abstract Mambo is a full-system simulator for modeling PowerPC-based systems. It provides building blocks for creating...

306

Candidate concepts for query definition

| | |
|---|---|
| 1 PowerPC | 2 Full system simulator |
| 3 Mambo (software) | 4 IBM |
| 5 Simulator | 6 Multiprocessor |
| 7 Scalability | 8 System Simulation |
| 9 Linux cluster | 10 Thread migration |
| 11 Simulation | 12 Policies and mechanisms |
| 13 Hierarchies | 14 POWER7 |
| 15 PowerPC 750 | 16 High performance computing |

308

Top concepts (from results)

| | |
|---|---|
| 1 Power management | 2 Instruction set |
| 3 Computer cluster | 4 United States Patent and Trademark Office |
| 5 PowerPC | 6 Web server |
| 7 University of Michigan | 8 Server (computing) |
| 9 Embedded system | 10 Portable Document Format |
| 11 CPU cache | 12 Magnetoresistive random access memory |

IBM Research — 700

Navigation: industries & solutions | Services | Products | Support & downloads | My IBM | Search for people Our people >

Tabs: Featured research | Cognitive computing | Client programs | Locations | Our people | Careers

Susan Miller — feedback
Usability and Accessibility Research
Example Research Center, Yorktown, NY, USA
smiller@email.com  +1-914-555-####

Project Pages
- Accessibility Tools for Web Developers
- accessibilityWorks
- Auditory Interaction Modeling
- CogTool
- External Web Presence
- Human Performance Modeling for Usability Assessment
- IBM Family Science Saturdays
- Keyboard Optimizer
- Mobile Security
- Rock Climbing
- Usable Mobile Multi-Factor Authentication
- User Experience Design and Engineering
- Virtual World Accessibility

Professional Interests
- Computer Science
- Human Computer Interaction
- Mobile Computing
- Security and Privacy

Professional Associations
- ACM
- ACM SIGACCESS
- ACM SIGCHI

Tabs: Profile | Publications | Patents

I am a researcher in human-computer interaction (HCI), specializing in accessibility. Most of us will experience age-related changes in our abilities as we get older. Most of us will experience sensory, physical or cognitive impairment at some time. Whether permanent or temporary, this is a normal part of human experience that technology can and should accommodate. My work explores tools, interfaces and techniques that accommodate human abilities and disabilities.

Current projects include usable multi-factor authentication on mobile devices, and exploration of mobile touchscreen gestures. I am also contributing to the NIDRR-funded 'Profile Creation Support for Cloud-Based Accessibility' project.

I am secretary/treasurer of ACM's SIGACCESS special interest group on accessible computing, and an ACM Distinguished Scientist. I am also prior chair of the Watson branch of IBM's HCI community, and served as general chair of ASSETS 2009: The 11th International ACM SIGACCESS Conference on Computers and Accessibility. I am Associate Editor of the journal, ACM Transactions on Accessible Computing. A while back I co-edited a series of five American National Standards on remote control of devices through generated user interfaces.

My background is in artificial intelligence and computer science, including intelligent tutoring systems and parallel programming. My Ph.D. research at the University of Edinburgh examined typing and mouse errors of people with motor impairments, and self-configuring keyboards. This work won the best student paper award at the ASSETS 1998 conference and formed the basis of IBM's Keyboard Optimizer tool for keyboard configuration support.

A native of Scotland, I enjoy windswept mountains, riding my bike, and (vegan) chocolate.

---

Connect with us
- Create a profile
- Communities
- Academic collaboration
- Research collaboration
- IBMers past and present
- IBM Voices

Key topics
- Smarter Planet
- Analytics
- Big Data
- IBM Cloud
- IBM PureSystems
- Mobile Enterprise
- SmartLayer Cloud
- Smarter Commerce

Information for
- C-suite executives
- Industries
- Small and medium business solutions
- Developers
- IBM Business Partners
- Investors
- Job seekers

Shop & buy
- Special offers
- Personal computers
- Ready to buy?
- Financing
- Find a sales rep
- Find a Business Partner
- IBM logo merchandise

About IBM
- Latest news
- IBM's Centennial
- IBM Research
- Case studies
- Corporate responsibility
- Employee directory
- More about IBM

Popular links
- Careers
- Fix central
- Passport Advantage
- Product security bulletins
- Software
- System x
- Watson

FIG. 7

| Profile | Publications | Patents |

2013

- Distinguishing Users By Physical Accessibility on Mobile Smartphones
  Mary Johnson, James E Brown, Margaret Wilson, Susan Miller
  ACM Proceedings of the 2014 Conference in Computing Systems

- Personalizing Smartphone Interfaces of Performance
  Susan Miller, Thomas Moore, Nancy Taylor
  $14^{th}$ Annual Computer Conference on Accessibility
  - Abstract

- Extending the Role of Age and Real-World Tasks
  Maria Jones, Susan Miller, Thomas Moore, Lisa Davis, John C Anderson
  Proceedings of the 2012 conference on Security Applications

- Security Precautions in Computer Interactions
  Christopher Mitchell, Susan Miller, Thomas Moore, Michael Green, William Garcia, Benjamin Martin
  ACM Proceedings of the $13^{th}$ International Computer Conference

2012

- Self-Selection and Predictive Models of Laboratory Smartphones
  Susan Miller, Thomas Moore, Christopher Mitchell, Jaqueline Turner, Michael Green, Jennifer Hill
  ACM Proceedings of the Computer Convention 2014

- Understanding the Role of Fluid Intelligence by Broader Populations
  Susan Miller, Maxwell White, Alexander King, Deborah Allen, Lisa Davis, Thomas Moore, John C Anderson
  Proceedings of the 11th International Conference on Accessible Computing
  - Abstract

- Security Risks of Exploratory Behavior Models
  Susan Miller, Lisa Davis, Maxwell White, Deborah Allen, Alexander King, Helen Walker, John C Anderson, Thomas Moore
  ACM Proceedings of the 2014 Conference in Computing Systems

2011

- Pointing Devices and Broad Population Use
  Susan Miller, Maxwell White, Helen Walker, Lisa Davis, Thomas Moore, Deborah Allen
  Universal Access Convention on Computer Interaction

- The Role of Age in Intellectual Information Searches
  Nathan Baker, Susan Miller, Thomas Moore, Charles Adams
  Proceedings of the $27^{th}$ annual Computer Security Conference

⊕ The Role of Age in Intellectual Information Searches

Becky Smith, Benedict Mason, Caleb Kennedy, Nathaniel Ford

*Abstracts on Information and Systems (Japanese Edition) Vol. J24-D(No. 7), pp.963-974, 2009*
(Japanese)

⊕ Designing a Chain for Computer Clients on CD

Catherine Grant, Daniel Warren, Nathaniel Ford

*Proceedings of the 2008 symposium on Computing, pp. 1605-1606*

FIG. 17

AUTOMATICALLY LINKING TEXT TO CONCEPTS IN A KNOWLEDGE BASE

DOMESTIC PRIORITY

This application is a continuation of U.S. patent application Ser. No. 14/657,343, filed Mar. 15, 2015 which is a continuation of U.S. patent application Ser. No. 14/330,381, filed Jul. 14, 2014, the contents of which are incorporated by reference herein in their entirety.

BACKGROUND

The present disclosure relates generally to semantic search technologies, and more specifically to automatically linking text to concepts in a knowledge base.

Traditional information retrieval technologies are based on the indexing of data using keywords. A drawback of using keywords to index data is that when a query keyword is not present in a document, the document is not considered for a possible match to the query. One approach that has been employed to improve this situation is the application of query expansion techniques in which the original query is substituted with variants. When using query expansion techniques, a search term is substituted with a synonym, independent searches are performed on the search term and the synonym, and then the searches subsequently joined. In principle, the larger the number of different variants that are tried at query time, the higher the potential quality of the returned results, assuming that a good joining technique is in place. One disadvantage to query expansion techniques is that the need for very fast response times implies that these techniques need to be relatively inexpensive, or alternately, that there are significant computational resources devoted to a search query so as to be able to complete the independent queries on time. This disadvantage is made particularly acute when doing searches with extremely rich ontologies because the query expansion may take a single search and turn it into potentially tens of thousands of searches.

Within the field of semantic reasoning techniques, one of the most popular techniques is latent semantic analysis (LSA). LSA functions by projecting a document's representation, typically in the form of a term-frequency/inverse-document-frequency vector, to a smaller space called the latent semantic space. This projecting is performed using matrix factorization techniques such as singular value decomposition (SVD), or by using statistical inference techniques such as expectation/maximization, as used in probabilistic latent semantic indexing (PLSI). Every dimension in this lower dimensional space is meant to represent an abstract concept that is generated automatically by the LSA technique. The LSA idea has given rise to numerous other variants that generally share the attributes described above. A disadvantage of the LSA family of techniques is that by themselves, they are not able to take advantage of the large volumes of crowd sourced data that have become available through the popularity of websites such as Wikipedia.

SUMMARY

Embodiments include a method for automatically linking text to concepts in a knowledge base. The method includes receiving a text string and selecting a plurality of data sources that correspond to concepts in the knowledge base. The selecting is based on contents of the text string. The method also includes calculating, for each of the selected data sources, a probability that the text string is output by a language model built using the selected data source, calculating a probability that the text string is output by a generic language model, calculating link confidence scores for each concept based on a differential analysis of the probabilities, and creating a link from the text string to one of the concepts in the knowledge base. The creating is based on a link confidence score of the concept being more than a threshold value away from a prescribed threshold.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a user interface for displaying search results in accordance with an embodiment;

FIG. 7 depicts an external view of a user interface of a researcher profile in accordance with an embodiment;

FIG. 8 depicts a user interface of an external view of a researcher publication page in accordance with an embodiment;

FIG. 11 depicts a user interface of a primary profile editor in accordance with an embodiment;

FIG. 17 depicts a user interface in accordance with an embodiment;

DETAILED DESCRIPTION

Figure 1:
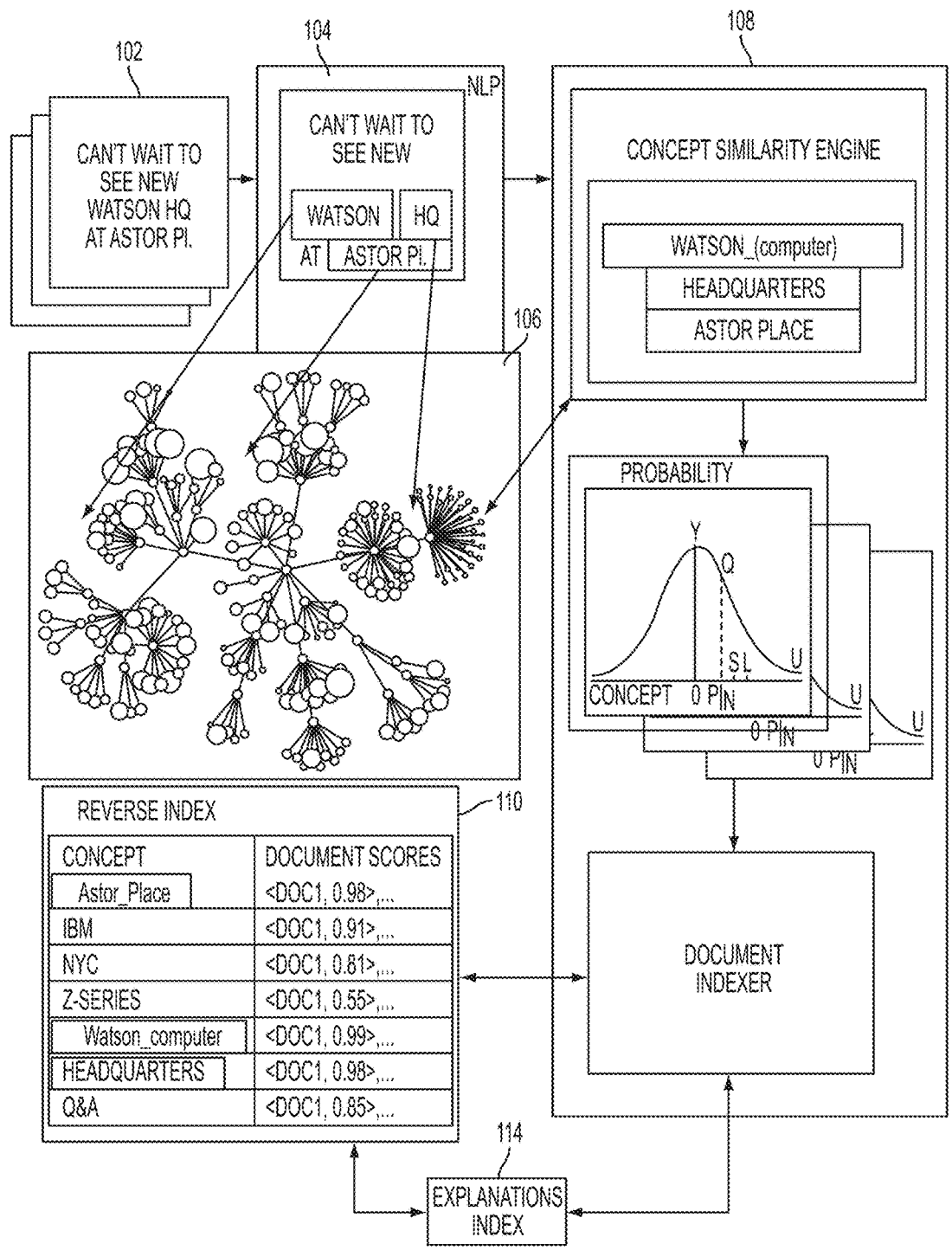
FIG. 1 depicts a high level view of a system for performing semantic searching in accordance with an embodiment.

Embodiments described herein can be utilized for searching, recommending, and exploring documents through conceptual associations. Embodiments include the use of semantic search technologies that combine information contained in knowledge bases and unstructured data sources to provide improved search results.

Embodiments described herein can also be utilized to automatically link text (e.g., from a document) to concepts in a knowledge base. For example, the sentence "The computer programmer learned how to write Java in school." contains three concepts: computer programmer, Java, and school. An embodiment of the automatic text linker described herein can discover these three concepts and link them to the most relevant concepts that it can find in a knowledge base.

Embodiments described herein can further be utilized to automatically add new entries into an existing knowledge base based on contents of a document. This can allow the knowledge base to continue to be updated and remain relevant as new documents are added to a corpus.

Embodiments described herein can further be utilized to compute the relevance of a document to concepts that are not specified in the document. Concepts extracted from the document can be used along with a concept graph to determine whether the document is related to other concepts.

Embodiments described herein can include the use of efficient data structures for storing and querying deep conceptual indices. A document can be received, concepts extracted from the document, confidence levels calculated for the various concepts, and then a representation of the document can be created in a concept space that connects the document to all possible concepts (not only the ones that were found explicitly in the document). Embodiments described herein are directed to how this information can be organized in a computer system so that it can be efficiently queried against and maintained.

Embodiments described herein can further include providing a user interface for summarizing the relevance of a document to a conceptual query. In addition the relevance of a plurality of documents to a conceptual query can be summarized, including assigning the documents to groups based on how relevant the documents are to concepts specified in the query.

As used herein, the term "concept" refers to an abstract idea or general notion that can be specified using a collection of names or labels, and a corresponding description. Additionally, sample sentences describing the concept may be included in the description of the concept. Concepts, such as, for example, "To be or not to be", "singular value decomposition", "New York Yankees" or "iPhone 6" may be encoded in a web page (e.g., Wikipedia).

As used herein the term "query" refers to a request for information from a data source. A query can typically be formed by specifying a concept or a set of concepts in a user interface directly or indirectly by stating a query in natural language from which concepts are then extracted. As used herein the term "conceptual query" refers to a type of query that is specified by listing one or more concepts in a concept graph.

As used herein the term "corpus" refers to a collection of one or more documents represented using text (e.g., unstructured text).

As used herein, the term "concept graph" refers to a visual representation that may be used to define a space of concepts and their relationships. A concept graph is an example of a knowledge base in which knowledge is represented with nodes in the graph as concepts and edges in the graph representing known relations between the concepts. A concept graph can be derived from crowd-sourced data sources such as wikis, which focus on defining concepts (e.g., Wikipedia). A concept graph can additionally be augmented with concepts found in new unstructured data sources.

Embodiments described herein rely on the ability to compute an estimate of how relevant a concept in a concept graph is to another concept in the concept graph. One way to accomplish this is through the use of Markov chain techniques. A Markov chain can be built by regarding each of the nodes in the concept graph as a state in the Markov chain, where the links in the concept graph are an indication of the next states that may be visited from that state. The probability of going to a state conditional upon being in another state can be made to depend on a weight that may exist for an edge in the concept graph. Suppose there are two concepts, A and B, and a requirement to compute how relevant these concepts are to each other. An initialization probability vector is initialized by setting to 1.0 the probability of being in the state related to concept A, and then the Markov chain is iterated. Computationally, this is accomplished by first multiplying the transition probability matrix of the Markov chain times the current state probability vector. After iterating, the resulting vector is linearly mixed with the initialization probability vector so as to emulate a "teleportation" back to the initial concept. Mathematically, if the initialization probability vector is v0, and the transition probability matrix is M, and the teleportation parameter is alpha, iterating the Markov chain can mean computing this recursion:

$$v^\{i+1\}=\text{alpha } M\, v^\{i\}+(1-\text{alpha})v^0$$

This recursion is iterated for, for example, L steps. The resulting vector can be regarded as a measure of how relevant concept A is to all other concepts in the graph. However, experimentation with this technique shows that it often overstates or understates the relevance of a concept to concept A in the following way: if a concept has many "in links" in the concept graph, (for example the concept is: U.S.A) then it will be deemed highly relevant to concept A independently of what concept A is. A similar statement can be made when a concept A is very lightly linked. Therefore, v^L on its own may not suffice, and instead it is processed through a normalization stage. One normalization is to divide each entry of v^L by the corresponding entries of a vector u^L, which is obtained by a similar recursion:

$$u^\{i+1\}=\text{alpha } M\, u^\{i\}+(1-\text{alpha})u^0$$

where instead u^0 is a uniform distribution. This is an example of one technique and other normalization techniques are also possible.

Effectively, (setting aside the normalization described above) what these Markov chain techniques are accomplishing is to measure the relevance of a concept to another concept by performing a weighting of each of the paths that connect a concept to another concept. The score of each path can depend on the length (number of hops) of the path, on the various transition probabilities connecting the concepts present in the paths, and on the teleportation parameter alpha. The Markov chain computation has the advantage of performing this weighting in an efficient form relating concept A to every other concept. This technique for computing the degree to which a concept is relevant to another concept described above is not the only possible technique. For example, a concept graph may have links which have type (or equivalently predicate) information, effectively creating (subject, predicate, object) triples. The link type may then be used to compute an additional link weight, which can be used to modify the link's probability in the transition probability matrix (by, for example, making the probability of the link proportional to the link weight and) which then affects the overall path score. One possibility is to make the link weight for some link types equal to zero, thereby effectively erasing the link from the graph. The capability of affecting the path scores using link types and weights allows the definition of a family of techniques for measuring the relevance of a concept to another concept, instead of a single one. Embodiments described herein may utilize each or a combination of these techniques.

Additional techniques that can be utilized by embodiments for computing the relevance of one concept to another concept can include the use of not only the links between edges, but also information in the nodes of the concept graph such as the name or names of the concept and the description of the concept in order to measure the relevance to another concept.

Additional mechanisms that can be utilized by embodiments for computing the relevance of a concept to another concept include other known semantic similarity or relatedness techniques. Examples of such techniques can be found, for example, in articles such as: "Using Information Content to Evaluate Semantic Similarity in a Taxonomy" by Philip Resnik (1995); "An Information-Theoretic Definition of Similarity" by Dekang Lin (1998); "Algorithmic Detection of Semantic Similarity", by Ana Gabriela et al. (2005); "Semantic Similarity Based on Corpus Statistics and Lexical Taxonomy" by J. J. Jiang et al. (1997); "Introduction to Latent Semantic Analysis" by Landauer, Foltz, Laham (1998); "A Knowledge-Based Clustering Algorithm Driven by Gene Ontology" by Cheng, J et al. (2004); and "The Google Similarity Distance" by Cilibrasi et al. (2007). It will be understood that embodiments remain applicable and may utilize any metric for measuring the relevance of a concept to another concept. Embodiments are not limited to specific concept to concept degree of relevance or relatedness metrics.

Referring now to FIG. 1, a high level view of a system for performing semantic searching is generally shown in accordance with an embodiment. The system shown in FIG. 1 can be utilized for searching, recommending, and exploring documents through conceptual associations. As shown in the embodiment of FIG. 1, a document 102 (e.g., from a corpus of documents) is input to a natural language processing (NLP) engine 104 and text from the document 102 is automatically linked to concepts in a knowledge base 106. In an embodiment, the NLP engine 104 can also define new concepts to be added to the knowledge base 106 based on contents of the document 102. The concepts from the knowledge base (both existing and newly defined if any) that are found in the document 102 are referred to herein as the "extracted concepts" or as the "concepts extracted from the document."

As shown in block 108, the system can also compute the relevance of the document 102 to concepts in the knowledge base 106 that are not specified in the document 102 using the extracted concepts and the knowledge base 106. In an embodiment, a degree of association between the extracted concepts other concepts (e.g., as indicated by the knowledge base 106) is used to determine a relevance of the document 102 to concepts not extracted from the document 102. Output from block 108 can include, for each concept in the knowledge base 106, a likelihood that the document is related to the concept. In another embodiment, the output from block 108 can include the relation information for just those concepts in the knowledge base 106 that meet a threshold such as the "most related" or those with a likelihood over a specified threshold.

The system can also generate a reverse index 110 that includes for each concept in the knowledge based 106, a likelihood that the document 102 is related to the concept. The document scores shown in the embodiment of the reverse index 110 in FIG. 1 indicate the likelihood that the document is related to the concept. The system can also generate an explanations index 114 which can be used to summarize the relevance of the document 102 to a query. After documents have been ingested and processed, and the reverse index 110 and explanations index have been calculated, a query is the main mechanism with which an agent external to our system interacts with our system. A query is simply some input that is passed to the system so that relevant documents are returned and suggested, together with an explanation of why they are so. Most of the queries described herein are "conceptual queries", in which the query includes one or more concepts in knowledge base or concept graph. However conceptual queries may have been derived from a simple string of text as well.

Embodiments described herein can be used to automatically link text (e.g., from a document) to concepts in a knowledge base. As described above, the sentence "The computer programmer learned how to write Java in school" contains three concepts: computer programmer, Java, and school. An embodiment of the automatic text linker described herein can discover these three concepts and link them to the closest (most relevant) concepts that it can find in a knowledge base. As used herein, the term "closest concept" refers to a concept that is "most relevant."

In an embodiment it is assumed that natural language can be modeled using a conceptual generative language model. A generative model is one which describes how to randomly generate data given some hidden parameters. In a conceptual generative language model, the key mechanism for generating output relies on the notion of a concept. In a conceptual generative model, it is assumed that that a human externalizes a sequence of words that come to mind while thinking of a concept or a collection of concepts. For example, while thinking of the concepts "New York", "Statue of Liberty" and "Yankees Stadium" one may produce the words "Both icons of New York City, the State of Liberty and the Yankees Stadium have attracted masses of visitors over the years." As described further herein, a conceptual generative model can be specified by considering concepts as hidden parameters and the output text as the observations of a hidden Markov model.

In addition, in an embodiment, it can be assumed that the task of deciding whether to link a portion of text to a concept in a knowledge base of concept graphs can be treated as a "differential" test; that is, some text is linked to a concept only if the probability of the text assuming that the author was "thinking" about that concept when writing the text is sufficiently higher than the probability that the author was thinking of no particular concept (i.e., a generic language model) when writing the text. In addition, a higher level of confidence can be associated with linking a portion of text to a particular concept when the probability of the text assuming that the author was "thinking" about that concept is sufficiently higher than the probability that the author was thinking of other competing concepts. For example, the sentence "I wish I could drive a Maserati" will have a much higher probability p1 of having been produced by someone thinking of the concept "Maserati" than the probability p2 of being produced by someone who is not thinking about any particular concept, the latter modeled typically by assuming that words or collections of words are produced by picking them through some random mechanism from a generic corpus of text. Additionally, the same sentence has also a probability p3 of being produced by someone thinking of the concept "Fiat", and that similarly, p3 will also be much higher than p2. So both "Maserati" and "Fiat" are competing concepts for what a person may have been thinking of when having uttered that sentence. However, the probability p1 for "Maserati" would be noticeably higher than that of p3 (for "Fiat") because it is a much more specific concept for what the human may have been thinking of at the time of utterance. So in the basis of this differential analysis, it can be concluded that one should select "Maserati" as the underlying concept, and possibly in addition, to point out that there is a word (the last word in the sentence) that can be pointed to as a specific mention of the concept "Maserati". If the original sentence was changed to "I wish I could drive a car", then while the probabilities p1 (for thinking of "Maserati") and p3 (for thinking of "Fiat") as defined above would still be high, since, the probability p2 of not thinking of any particular concept would be closer to p1 and p3, and p1 and p3 would be closer to each other. Therefore, on the basis of this new differential analysis, for this new sentence it can be determined that neither Maserati nor Fiat would get a confidence of being what a human may have been thinking of when uttering that second sentence.

Sometimes, the differential analysis described above is not sufficient to establish a contrast between the various probabilities to make a decision, and additional information is needed. For example, in the sentence "I love me a good ball game" (never mind the incorrect grammar of the sentence), possible candidate competing concepts may be "baseball", "soccer", "tennis", "basketball", etc. Imagine however that one was giving additional context, either in the form of a second text or a collection of concepts. For example, suppose it is known that the underlying user had purchased items from a store specializing in New York Yankees memorabilia. Then, through analysis of the visited website, one can extract the concept "New York Yankees" as a possible side context. When combining this information with the above, then the differential analysis improves, and then one might select "baseball" as a more likely concept.

In an embodiment, it can be assumed that when a human is thinking of a concept, in his/her mind there are multiple data sources that relate to this concept. For example, a set of data sources can include: one data source that is a collection of names for the concept; another data source that is a text that describes what this concept is; and a further data source that is a series of examples to which the concept is referred. Other sets of data sources may be used by embodiments and may vary based on particular applications and concepts being analyzed.

In a generative model, it can be assumed that, with some probability, that a human will utter words that will either appear verbatim or with some variation in one or more of the data sources in a set of data sources. In addition, it can be assumed that, with some probability, the human will utter a word that comes from a data source that is generic (e.g., not in the set of data sources for the concept), that is, it does not refer to any concept specifically. In the simplest generative models, each of the data sources in the example set of data sources described above is associated with a bag-of-words model where a word is chosen independently and identically distributed from the bag-of-words. In addition, it can be assumed that each of the data sources is chosen with a certain probability in an independent, identically distributed fashion.

More complex models for generating words can also be used to provide improved linking between a portion (e.g., one or more words) of text and a concept. For example, when the data source is a set of names of a concept, the model for selecting words can include the following: first select a name to be uttered with some probability; and then utter the sequence of words as given by the concept name selected. Additional variants can include one or more words in the sequence of words in the concept name being skipped, or morphed into a variant (for example, add a plural or convert into singular, or capitalize, or lower case, or add a typo). A further variant includes the possibility of uttering the words in the sequence of words out of order.

When uttering words from a data source that is the description of a concept, a word in the data source can be selected at random using a probability distribution that gives a higher probability to words that occur earlier in the description and a lower probability to words that occur later in the description. One possible model is to choose a positive integer x from a distribution that assigns a probability to x that is proportional to $(1/x)^a$ up to a maximum possible integer which is the count of words in a document, where a is a parameter that can be estimated through standard statistical parameter estimation methods. After choosing this integer, the corresponding word is uttered. After this, the simplest model simply repeats this process again. More complex models may choose a "phrase length" which results in uttering not only the word in position x, but also subsequent words in the order in which they appear in the data source up to a certain phrase length. Other models may not utter exactly the same words, but variants or synonyms that can be obtained through the use of thesauri or other data sources.

The example in the above text describes how individual data source models can generate language, and suggests that the selection of which data source models are responsible for uttering language should be left to a simple independent, identically distributed model. In an embodiment, this simple independent, identically distributed model is replaced by a more complex Markov model where once a word is uttered from a data source, the chances that it is uttered from the same data source are higher than the chances that it is uttered by a different language model.

The possibility that a person is thinking of more than one concept when uttering language can also be considered. In this case, a sentence, or collection of sentences, being uttered is regarded as having "epochs" inside of it. The epochs can be generated using a single concept model, however switching from an epoch to another epoch can result in language being uttered from a different single concept model. The model for choosing which concept to utter words from can also be treated as a Markov model, where the chances that a word is uttered from a certain concept after uttering a word coming from that concept's data sources is higher than the chances of uttering a word from another concept's data sources.

The model described above can be seen as a form of a hierarchical hidden Markov model, where in the top level, a concept is chosen, then in the next level, a data source within the concept is chosen, and then in the next level, a word from the data source is uttered. The observables of this hierarchical hidden Markov model are the words generated and the un-observables are the various choices described above leading to the selection of the word.

As described herein, it is possible to model language utterances through conceptual generative language models. Each of these conceptual generative language models can be associated with a technique for estimating the probability that a given sequence of words (e.g., a sentence) is uttered for the given conceptual generative language model. These probability estimates can be obtained using computational techniques that will reflect the underlying conceptual generative language model; for example for simple bag-of-words, counting the frequency of the words in a given sentence and then using the probability of a word in the bag-of-words suffices to compute a probability estimate. In the case of a hidden Markov model (HMM), the situation is more complex because to compute the exact probability given a model it can be necessary to sum the probabilities of all possible sequences of states. The computational technique used in this case falls under the general class of dynamic programming methods; and it is important to note that in most instances, an exact calculation of the probability is unnecessary and this can be used to further simplify the calculations.

The idea of "differential" testing of probability assignments to portions of text is now discussed as it is a key idea that can be utilized for performing automatic linking(s) of text to concepts. As an example, consider the previous example text "The computer programmer learned how to write Java in school."

Suppose that one is attempting to decide whether the word "Java" in the sentence above should be linked at all, and if so, whether it should be linked to Java the computer programming language, Java the Indonesian island, or Java the coffee.

Using the previous discussion, for this particular task one can employ four different language models: 1) a generic language model in which no particular specific concept is on the mind of the human (for example obtained by analyzing large volumes of text with a variety of provenances); 2) a language model for when Java the computer programming language is being thought of; 3) a language model for when Java the Indonesian island is being thought of; and 4) a language model for when Java the coffee bean is being thought of.

The probabilities of the term Java in the text T="The computer programmer learned how to write Java in school" referring to a programming language, coffee bean, Indonesian island, or something else can be estimated using the four language models above. These Probability estimates can be written as:

p(T|Java the programming language)
p(T|Java the coffee bean)
p(T|Java the island)
p(T|generic language model)

Next, the following ratios can be formed:
p(T|Java the programming language)/p(T|generic language model)
p(T|Java the coffee bean)/p(T|generic language model)
p(T|Java the Island)/p(T|generic language model)

Only if any of these ratios is sufficiently high would linking the word Java in the text to one of the three Java concepts be considered.

It can also be assumed that there could be a prior P(Java the programming language), P(Java the coffee bean), P(Java the island) denoting the a priori probability with which these concepts are expected to show up in a pool of concepts extracted from text. Note that although this prior probability should not favor any specific concept, it could favor concepts in a specific pool of concepts in a certain area of topics (for example emphasizing technology). If no prior probability is identified, it can be assumed that these probabilities are identical to each other.

Next, a maximum can be chosen amongst:
p(T|Java the programming language)
p(Java the programming language)
p(T|Java the coffee bean) p(Java the coffee bean)
p(T|Java the island) p(Java the island)

This maximum can be regarded as a maximum a posteriori (MAP) estimate of the originating concept, or a maximum likelihood (ML) estimate if the prior probability is uninformative. From the earlier description, it stands to reason that p(T|Java the programming language), for example, would be higher than p(T|Java the coffee bean) since in the language model for Java the computer programming language there will be a data source containing a description where words like "computer", "computer programming", "computer programmer", "programming", and so on appear, while in the case of the language model for Java the coffee bean, those words will not appear.

If the maximum (in this case p(T|Java the programming language)) is sufficiently higher than p(T|Java the coffee bean) and p(T|Java the Island) and also if p(T|Java the programming language) is sufficiently higher than p(T|generic language model), where sufficiently higher can be ascertained through the use of a ratio (e.g., user specified or automatically assigned), then a relatively high confidence can be associated with linking the text, and in particular the Java mention, to Java the computer programming language. The same can be done for other mentions in the text T, for example "computer programmer" and "school."

As described previously, there are many techniques for assigning probabilities to a string for given language models. One class of techniques draws from ideas from the data compression literature. In the data compression, the goal is to produce the shortest description for a piece of data so that it can be communicated efficiently to a receiver. When the sender and receiver share some common context (i.e. they are told the text is being produced by a human thinking about a given concept), then the descriptions can be potentially further shortened by taking advantage of the common context.

A basic result from the data compression literature is that the problem of assigning probabilities to strings of data is in many ways similar to the problem of finding efficient representations of the text, and thus data modeling techniques have an implication on data compression algorithms (through the use of algorithms such as arithmetic coding) and vice versa, algorithms for data compression can be used to build estimates of probabilities of strings.

The latter observation makes it possible to use data compression algorithms to perform many of the operations described above for the task of estimating probabilities of strings. For example, suppose that one wants to estimate the probability that the text:

T="The computer programmer learned how to write Java in school"

came while thinking of the concept "Java, the computer programming language." What one could then do is take a description of Java, the computer programming language, and then compress the text T assuming both sender and receiver have access to this description; this can be done, for example, by assuming that T is an extension of the description of the concept and using a pattern matching compression algorithm such as Lempel-Ziv 77 or 78 starting from the first character of T. One could also compress T using a general context. These compressions as described above result in probability estimates that can be used as described above.

Other methods of computing an estimate of the probability of the text given a concept or a general language model can be implemented by embodiments, and embodiments are not limited to the ways to perform the analysis described herein. For example, one could extract X features from the text (each feature could be a subsection of the text) and then the analysis above can be applied described above for these features, instead of the entire text at the same time. Then instead of having, for example, one quantity, one has X quantities. One way to aggregate these X quantities is to multiply them. One way to select these features is to choose as a feature a maximal sequence of words in T that also appears in a data source for a concept. Another possibility is to choose a maximal sequence of characters in T that also appears in a data source for a concept.

Figure 2:
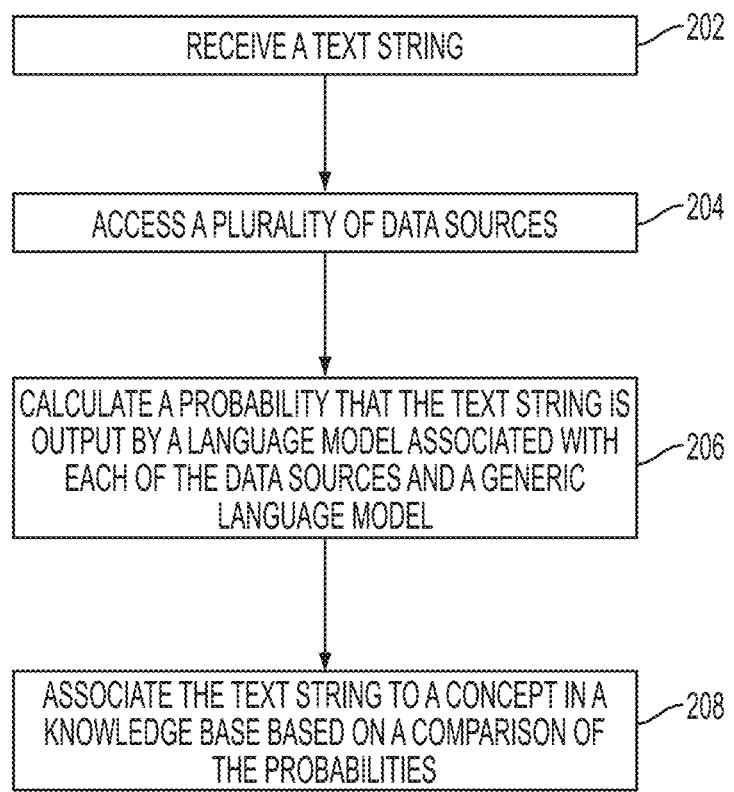
FIG. 2 depicts a process for automatically linking text to concepts in a knowledge based in accordance with an embodiment.

Turning now to FIG. 2, a process for automatically linking text to concepts in a knowledge base is generally shown in accordance with an embodiment. In an embodiment, the linking is performed using differential analysis. At block 202, a text string is received. The text string can be a collection of words, a sentence, a paragraph, or a whole document. At block 204, data sources are selected based on contents of the text string. Each data source can correspond to a concept in the knowledge base and can be used to build language models. Each of the data sources can include one or more collections of names for a corresponding concept, a description for the corresponding concept, sentences referring to the corresponding concept and/or paragraphs referring to the corresponding concept. At block 206, probabilities that the text string is associated with each of the language models as well as a generic language model are calculated. In an embodiment, the generic language model is derived from a generic data source not specified to any of the concepts in the knowledge base.

At block 208, the text string is associated (e.g., via a link) to a concept in a knowledge base based on a comparison of the probabilities as described herein. The comparison can include calculating link confidence scores for each concept based on a differential analysis of the probabilities. The differential analysis can include comparing the probability that the text string is output by a language model built using a data source to the probability that the text string is output by a generic language model. The differential can also include comparing the probability that the text string is output by a language model built using a data source to a probability that the text string is output by a language model built using a competing data source. In an embodiment, the text string can be linked to additional concepts in the knowledge base. In an embodiment, the link can apply to just a subset of the text string, with the subset indicated in the link. The words in the subset can be consecutive or non-consecutive in the text string. In an embodiment, a link can be created from the text string to one of the concepts in the knowledge base based on a link confidence score of the concept being more than a threshold value away from a prescribed threshold.

An key issue to be addressed can include is the ability to do conceptual searching for things that are not already previously present in an existing concept graph, or alternately, the ability to automatically add entries in to an existing knowledge base. A process of accomplishing this will now be described in accordance with an embodiment.

The process described herein can assume that a string of text is given which represents the name of something that is to be linked conceptually to other concepts in an existing knowledge base. It can also be assumed that there is a reference corpus of data that is given to the system which at a minimum mentions this string of text from generally informative language. It is does not have to be assumed that this string of text is presented in only one specific sense (in case the string of text has multiple distinct senses), nor that this corpus of data is structured as an encyclopedia or dictionary (both assumptions that would make the task in question easier).

It is further assumed that there is an existing concept graph where nodes of the graph represent concepts and edges between nodes represent known associations between the concepts. Each concept in the concept graph is given a name or collection of different names. There are no assumptions made in terms of whether the string of text refers to a concept already defined in the concept graph or not. The concept graph and the reference corpus of data may or may not be related. Examples of a variety of combinations of these scenarios will now be described.

In the first example, the corpus of data and the concept graph are entirely unrelated. For example, it is assumed that the reference corpus of data is the external web pages of IBM Researchers (http://researcher.ibm.com) which are a collection of web pages in which researchers describe their research interests, education, projects, list their papers, etc. For the concept graph, it is assumed that Wikipedia is used as the knowledge base. Wikipedia articles may be assigned to nodes in the concept graph, and the edges between nodes may be hyperlinks referencing a Wikipedia article from another Wikipedia article.

As an example, assume that the string of text is "Mambo". In the context of the IBM Researchers corpus of data, "Mambo" is an IBM project that relates to computing processor simulations, unlike the sense of a music or a dance as it may be more commonly known in a general context. It is assumed that this sense of Mambo (the IBM project) is not present in the concept graph, and thus is an opportunity to demonstrate the embodiments described in here. As shown in FIG. 3, the term "Mambo" is entered in box 302.

In an embodiment, text is extracted from the reference corpus which may contain information describing aspects of the "Mambo". One possible way of accomplishing this is to do a text search for the word "Mambo" in the reference corpus and then extract text containing these mentions of the word "Mambo" from the corpus of reference. The text search can be done using a number of techniques known in the art. When doing this text search, variants of the word "Mambo" may be searched for as well, for example "mambo" (the lower case version of "Mambo") or "MAMBO" may be also searched.

As shown in FIG. 3, the result of the search for "Mambo" on the reference corpus is illustrated. As illustrated, multiple documents 304 in the corpus contain mentions of the word "Mambo".

Following the text search, the text containing these mentions is analyzed using a technique for extracting concepts from this text. The embodiments described herein provide one such technique; however, it will be understood that other techniques may be used as well. The extracted concepts can be assumed to be already previously present in the concept graph. In FIG. 3, the concepts that were extracted from the text containing these mentions are shown at 306.

The extracted concepts can be used in at least two distinct ways, namely, for a system query and for concept graph expansion.

With respect to the system query use, the extracted concepts may be applied as a query to a system that can perform conceptual searching or recommendations. Such a system does not have to return documents related to the concept graph or the corpus of reference (although it could also do that). The key assumption though is that the system can accept as an input query the concepts extracted in the second step above, and that it is capable of returning documents conceptually associated with the input query, independently of the origin of these documents.

With respect to the concept graph expansion use, a new node in the concept graph is added with the name "mambo", and is connected to other nodes in the concept graph using the extracted concepts. Additionally, the text from which the concepts were extracted, their provenance and the confidence of the extracted concepts may also be added as additional metadata in the new concept definition.

In many situations the steps described above will be successful. But in some situations, the text containing the mentions of the string of text may contain references to concepts that are unrelated to the potential new concept. This can problem can be remedied through the following technique. The concepts extracted from the text containing the mentions can undergo a process of "de-noising". In the context of this problem de-noising refers to the act of estimating the cross-relevance of the concepts extracted (possibly sometimes even removing them). If there is a subset of concepts extracted that have some degree of associations with each other, then the confidence that those extracted concepts can be used in the new concept definition increases. Alternately, if there are extracted concepts for which other related extracted concepts cannot be found, then the confidence that those extracted concepts can be used reliably in the definition of the new concept diminishes.

Estimating the relation between any two concepts can be attained by exploiting a concept graph. In particular, the concept graph may be utilized to determine these relations (e.g., whether they appear explicitly in the form of links in the concept graph between the two concepts, or implicitly through an exploration and weighting of the various paths that connect the concepts in the concept graph). In another embodiment, a technique is described for estimating how close is a specific concept in a collection of extracted concepts to the rest of the extracted concepts by analyzing the top M closest concepts and then merging those M scores using information combining techniques. A sample of top concepts is shown generally at 308 in FIG. 3.

In some situations, it is possible that the reference corpus of data may contain references to the same string of text that refer to two or more senses. For example, one may postulate that the pages of the IBM researchers may sometimes refer to "MAMBO", a local club with interests on Latin-American music. A search for "Mambo" may (after lower/upper casing normalization is applied) result in documents containing both references to the project as well as references to the club. If there is metadata that can be used to separate these two senses (for example, some pages are known to be about projects, and some pages are known to be about hobbies), then the extracted concepts can be separated in two groups (or more than two groups, depending on the situation). If no such metadata is available, or if the metadata is unreliable so that it needs to be aided by further analysis, embodiments of the invention may utilize clustering algorithms to attempt to separate these two intermixed senses, as will now be described.

In an embodiment, it is assumed that a collection of extracted concepts is provided. From these concepts, feature vectors are obtained. One possible feature vector is to compute the likelihood vector for each concept that indicates how likely it is that the given concept is related to all possible other concepts in the concept graph. Other feature vectors may subsample the feature vector described above. In the two examples above, the concept graph is used to compute those feature vectors. Once in possession of the feature vectors, clustering algorithms (for example k-means) may be employed to cluster the associated concepts in groups. The clustering separates concepts into distinct groups on the basis of their conceptual closeness. In the example above, extracted concepts related to computer simulations, processors, etc. are clustered in one group and concepts related to Latin-American music and hobby clubs are clustered in another cluster.

Once in possession of two or more clusters, one can proceed to employ the results of this analysis. The two clusters are regarded as two distinct senses of the same string of text. As stated before, there are two applications described so far: in the first application, the string of text is interpreted as a system query in which documents are returned from some corpus through conceptual associations. In the second application, the goal is to augment a concept graph with a new concept definition.

In the first application, because multiple senses of the given string of word have been discovered, it is not possible to immediate perform a conceptual query. However there may be contextual information that can be used to select a most likely sense (for example, it may be known that the general line of inquiry is around "computer science" due to the application at hand or background information about the user, or the browsing history of a user). In resonance with the embodiments described herein, it is assumed that the contextual information can be summarized as a collection of concepts from a concept graph. The concept graph may be employed along with the various techniques described in this embodiment to measure the closeness between the concepts in the contextual information and each of the groups of concepts that define a sense of the string of text. Once this closeness is established, the most likely sense can be computed. For example, if there is a sense which sufficiently separates with respect to the rest of the senses given the contextual information, then this sense is selected as the intended sense and a conceptual query is performed for the sense. Alternately, a user is presented with the option of selecting which sense of the string of text was meant, via a dialog on a user interface. Once the sense has been disambiguated by the user, the conceptual query can be performed as indicated above.

In the second application, which is that of enlarging a concept graph, the various senses of the string of text may be added separately to the concept graph as described above.

In the application where one seeks to enlarge a concept graph, an important challenge is that of automatically extracting strings of text which may be candidates for new concepts. One technique for automatic extraction can include processing the reference corpus using natural language processing technology and extracting all noun phrases that it contains. These noun phrases are natural candidates for incorporation as new concepts into the concept graph. The pool of noun phrases is then ordered according to some criterion of importance. Generally speaking, noun phrases that appear more frequently can be given higher priority, as there is evidence they are discussed with certain frequency, and also the quality of the definitions that can be derived is higher.

One challenge involves deciding when the task of automatically defining a concept is moot because the underlying concept is already present in a concept graph. This may be resolved by comparing the names of the concepts in a concept graph with the string of text, and when finding a sufficiently close match, then computing the conceptual closeness between the concepts extracted in the process of defining the string of text (for a single sense, in case where there are multiple senses found for the string of text in the reference corpus) and the concepts to which the close match concept found earlier is linked to in the concept graph. If there is a sufficiently high correlation between these two sets of concepts, then it is determined that it is not necessary to define a new concept, and instead the original concept in the concept graph may be sufficient.

One embodiment provides the capability to determine the meaning (or meanings) of a hashtag presented in a user's social media application (e.g., TWITTER). Typically, it is very difficult for a computer to understand the meaning of a hashtag from a single tweet because of the length of the tweet and the lack of context it has about the tweet. However, if one regards a large collection of tweets as the reference corpus, then analysis of this larger amount of text has a higher probability of successfully being able to define the meaning (or meanings, in case it has multiple senses) because analysis of the tweets' text using the embodiments described herein will result in linkages into an existing concept graph with higher probability than if a single tweet was employed. Here, the concept graph could be derived using Wikipedia, freebase, or other data sources.

The embodiments described herein offer great flexibility. In the earlier example, the reference corpus and the concept graph were not related. However, there are instances where the reference corpus and the concept graph may be closely related. For example, the concept graph may be derived from the articles of Wikipedia (e.g., where each node of the concept graph would have a name given by a Wikipedia article and its links to other nodes would be determined by the hyperlinks connection articles in Wikipedia). The reference corpus could be Wikipedia itself, including the full texts of each Wikipedia article. In this case, note that there is a very large number of noun phrases in Wikipedia that are not present as Wikipedia article names. These can be prime candidates for new concepts in a concept graph, demonstrating that the embodiments are also applicable and meaningful when the concept graph and the reference corpus are closely related to each other.

Figure 4:
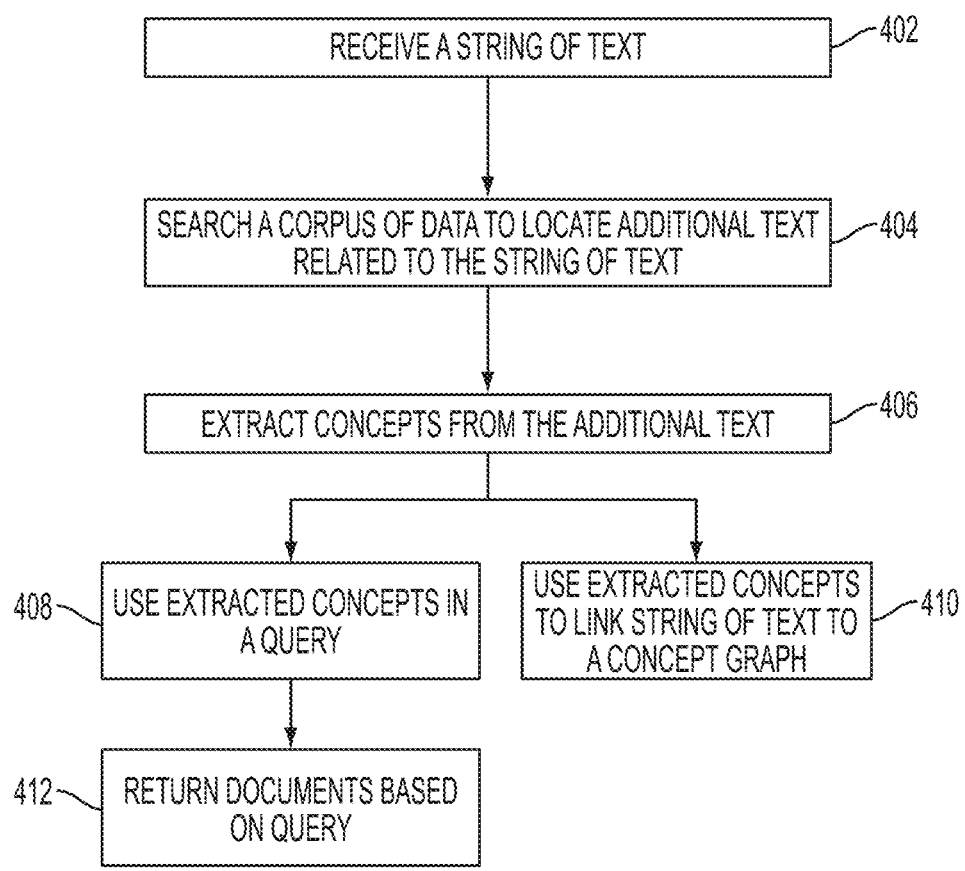
FIG. 4 depicts a process for new concept definition in accordance with an embodiment.

Turning now to FIG. 4, a process for automatic new concept definition is generally shown in accordance with an embodiment. At block 402, a string of text is received, and at block 404, a corpus of data can be searched to locate additional text related to the string of text. The searching can include searching for both the string of text and for variants of the string of text. At block 406, concepts can be extracted from the additional text. The extracted concepts can include a subset of concepts in a concept graph and can be de-noised to estimate the cross-relevance of the extracted concepts. In an embodiment, the corpus of data and the concept graph are separate entities. Processing then continues at block 408 or block 410.

At block 410, the extracted concepts can be used to link the string of text to the concept graph. It is determined whether the string of text should be linked to an existing concept in the concept graph. The determining can include determining similarities between the string of text and a name of the existing concept, and then deciding whether the string of text should be linked to the existing concept based on the similarities. The determining can also include determining a conceptual closeness between the extracted concepts and the concepts to which the existing concept is linked to in the concept graph, and then deciding whether the string of text should be linked to the existing concept based on the conceptual closeness. The linking can be performed if it was determined that the string of text should be linked to the existing concept in the concept graph. Alternatively, a new concept that is associated with the string of text can be added to the concept graph if it was determined that the strong of text should not be linked to the existing concept in the concept graph. Adding the new concept to the concept graph can include linking the new concept to at least one of the extracted concepts from the additional text. In an embodiment, the extracted concepts can be clustered into one or more clusters with related concepts. Based on their being two or more clusters, the following can be performed independently for each cluster: determining whether a new concept should be added to the concept graph based on the similarities of the string of text to the names of existing concepts and the similarities between the concepts in the cluster to the concepts linked to an existing concept; and based on determining that a new concept should be added, adding the new concept to the concept graph.

Referring back to FIG. 4, at block 408, the extracted concepts are used in a conceptual query, and at block 412 documents that are conceptually related to the extracted concepts are returned based on the query.

An embodiment includes computing the relevance of a document to concepts not specified in the document. Techniques described herein can be used for performing conceptual document integration techniques to create a deep vector representation of a document.

Embodiments disclosed herein relate to the use of a concept graph to define a space of concepts and their relations. As described previously, a concept graph can be derived from crowd-sourced data sources such as wikis which focus on defining concepts (e.g., Wikipedia) and can additionally be augmented with concepts found in new unstructured data sources. In an embodiment, concepts that exist in a concept graph are extracted from a document and then a vector representation of the document is created in "concept space" in which every dimension is a concept of the concept graph. As used herein, a concept space is a collection of two entities. One of the entities is a vector space with N dimensions. The other entity is a concept graph with N concepts, giving a precise meaning to each of the dimensions of the vector space. The extracting of concepts from a document can be done using "wikification" techniques which are known in the art. Unlike the term vector space model that is commonly used in the information retrieval community, where a document is represented by the frequencies of its terms (often also including the inverse document frequency of the terms), the vector representation described herein can have a value assigned to a vector entry that represents the relevance of the concept to the document or vice versa, and thus it has a much higher level semantic significance. It is important to note that in the concept vector representation of a document, the document may have nonzero scores for concepts that are actually not present in the document, but that are inferred to be relevant to the document using reasoning afforded to embodiments by the concept graph.

In what follows, reference is made to raw data that has been extracted from a document using for example, text annotation techniques such as the ones described previously which have the role of picking out mentions of concepts in the text. Reference is also made to inferences that are made from this data using a concept graph as an aid to make these inferences. The raw data extracted above is referred to herein as a priori data, or information, about the document. The inferences that are made on this data with the goal of computing a relevance score for that document for each possible concept in a concept graph are referred to herein as a posteriori inferences (or a posteriori information). The a priori and a posteriori labels refer to the data about a document before and after the application of knowledge from the concept graph, respectively.

As an example, suppose that from a document D concepts $c1, c2, c3, \ldots, cK$ have been extracted. Together with these concepts, confidence scores $s1, s2, s3, \ldots sK$ have also been extracted. These concepts $c1, c2, c3, \ldots cK$ together with the confidence scores $s1, s2, s3, \ldots sK$ constitute what is referred to herein as a priori information about the document. A confidence score can be a measurement or estimate of how sure the correct concept was extracted by the concept extraction process. In accordance with an embodiment, the goal is to obtain the relation between the document D and a general space of concepts (e.g., all or a subset of a concept graph). This representation can connect the document D with concepts not necessarily present in the original description of it, via exploitation of deep conceptual connections as seen in a concept graph (hence the name "deep concept vector representation"). This representation is referred to herein as including a posteriori inferences about the document which have now incorporated additional knowledge as related to concept. One type of relation to obtain is to compute how relevant a document would be for a query comprised of one concept.

An embodiment includes taking a priori data about a document and then employing a concept graph to improve the conceptual understanding of that document. Note that the concepts $c1, c2, c3, \ldots ck$ may have come with confidence scores $s1, s2, \ldots sk$ from the annotation techniques associated with the concept extraction. In a first step, these confidence scores can be further refined by taking into account the relations between the scores as made available through computations over a concept graph.

For the sake of an example, assume that the concepts extracted from a document are given by the list ["vanilla yogurt", "superman", "superman", "superman", "the green lantern", "batman and robin"]. To simplify it is assumed that the confidence scores of each of these annotations is 0.7. An observation by an informed human of this list could lead to the conclusion that this document is probably about super heroes in comics, with some emphasis on superman. The concept "vanilla yogurt" appears to be incongruent to the rest of the list, and there is no evidence to give it a strong weight, but similarly, no evidence to eliminate it from the list. Note that if the list had been ["the green lantern", "vanilla yogurt"] there would have been no reason to conclude that this document was particularly about comics, any more that it was about desserts, since the concept "vanilla yogurt" would still require explanation. The point of this example is that the various comics heroes references tend to reinforce each other's presence in the document D and the general notion that the document D is related to comics, and in particular DC Comics, grows as more comic related references are added to the list. In a computing system, the information about the connections between all of these concepts in the list comes from the concept graph. Incorporation of the knowledge in the concept graph, may lead to the refinement including increasing the confidence scores for each instance of "superman" to, say, 0.85 (from 0.7), to increasing the "the green lantern" and "batman and robin" confidence scores to 0.8 (from 0.7), and possibly to downgrade the "vanilla yogurt" score to 0.65 (from 0.7). These inferences are no longer a prior inferences, however this only one possible first step towards the general goal of conceptual understanding of the document.

Continuing with the example, suppose that the items ["wonder woman", "aquaman"] are added to the list ["vanilla yogurt", "superman", "superman", "superman", "the green lantern", "batman and robin"]. At this point, it is not particularly surprising that these kinds of things are being added to this list. It is still useful information that can be reflected in the final representation of the document, but at this point adding ["wonder woman", "aquaman"] to this list may not have as much value as adding ["the green lantern", "batman and robin"] to the list ["vanilla yogurt", "superman", "superman", "superman"]. This example illustrates that a proper conceptual summarization is likely to account not only for the reinforcement between concepts, but also for the verbosity in a description. For purposes of illustration, the confidence scores after "wonder woman" and "aquaman" are added may only increase the confidence for "superman" to 0.9 (from 0.85).

With these two motivating examples in mind, a formalism for identifying the updated confidence scores $w1, w2, w3, \ldots, wK$ is now described in accordance with an embodiment. Assume that the concept space has a total of N concepts, where typically N is much greater than the number of concepts ever present in a document of reasonable size. A concept vector representation of the document D will be denoted as $r(D)$ and will comprise N numbers, each describing the likelihood that the document D is related to each respective concept, or even more particularly, how relevant the document D is to a single concept query. An individual concept can be regarded as a document with a single extracted concept, and thus via a slight notation overload, one can denote by $r(ci)$ the vector with N entries that describe the likelihood that the concept ci is related to any other concept in the concept space. Computing the vector $r(ci)$ can be done with a variety of techniques, including ones based on Markov chain simulations.

Recalling the example given before, a process can be performed to learn how each of the concepts $c1, \ldots, ck$ are related to each other. Let $r(ci)[ck]$ denote the likelihood that concept ci is related to ck, and assume that $r(ci)[cj]=\frac{1}{2}$ if there is no relation whatsoever. The matrix:

$$\begin{matrix} r(c1)[c1] & r(c1)[c2] & r(c1)[c3] & \ldots & r(c1)[cK] \\ r(c2)[c1] & r(c2)[c2] & r(c2)[c3] & \ldots & r(c2)[cK] \\ \ldots & & & & \\ r(cK)[c1] & r(cK)[c2] & r(cK)[c3] & \ldots & r(cK)[cK] \end{matrix}$$

contains the essential information needed to determine how concepts relate to each other and how verbose a description is, among other properties of analytic interest.

Recall that for a likelihood p the likelihood ratio (LR) can be defined as $LR(p)=p/(1-p)$, and that the log likelihood ratio (LLR) can be written as $LLR(p)=\log(p/(1-p))$. Also call $LR^{-1}(x)$ and $LLR^{-1}(x)$ the corresponding inverse functions. Choose a column, for example the ith column. By examining the column of this matrix, a number of statistics can be deduced, including an estimate of how many other concepts are related to concept ci in one way or another. In general, the row vector $$v=[\text{sum}\_\{i=1\}^{\{k\}}f(r(ci)[c1],si)\text{sum}\_\{i=1\}^{\{k\}}f(r(ci)[c2],si) \ldots \text{sum}\_\{i=1\}^{\{k\}}f(r(ci)[cK],si)] \quad (1)$$

where f( ) is a function that defines how to count the contribution of a matrix entry, can be seen as a general statistic that can be computed by specializing the function f(.). In the example above, $f(x,s)=0$ if $x=\frac{1}{2}$ and $f(x,s)=1$ if $x>\frac{1}{2}$ would be one possible choice. Another possible choice that actually uses the confidence scores would be $f(x,s)=0$ if $x=\frac{1}{2}$ and $f(x,s)=s$ if $x>\frac{1}{2}$. Other choices for f are possible depending on the application. For convenience, individual elements of the vector v are referred to as $v(cj)=\text{sum}\_\{i=1\}^{\{K\}} f(r(ci)[cj], si)$.

The row vector thus computed is an estimate for how much the general area of a concept is being mentioned, taking into account information from all other extracted concepts. A large value in an entry of the row vector implies a larger presence of the underlying concept, and vice-versa. The updated confidence scores w1, w2, w3, . . . , wK on the concepts can be defined as a function of the corresponding elements of v:

$$wj=g(v(cj)). \quad (2)$$

This function g(.) is an application dependent quantity that that can be used to control how much concept reinforcement is promoted and how much concept verbosity is promoted/demoted. Choices for g( ) are described herein below.

A unified a posteriori view of the document is formed. As described earlier, it can be assumed that from a document D concepts c1, c2, c3, . . . , cK have been extracted (possibly with confidence scores s1, . . . sK) and that via a procedure like the one described above, updated confidence scores w1, w2, w3, . . . , wK are derived for each of the extracted concepts. The task is now to create a view of how the document D relates to each of the N concepts in the concept space. Recall that the vector r(ci) describes the likelihood that the concept ci relates to every one of the N concepts. Thus, the document D can be mapped onto the concept space by weighting the vectors r(ci) using the updated confidence scores w1, w2, . . . wk:

$$\text{sum}\_\{i=1\}^{\{K\}}wi\ LLR(r(ci))) \quad (3)$$

where the above can be seen as a weighted average of log likelihood ratios, and where LLR(x) where x is a vector is obtained by applying the LLR function to each entry of the vector (with a similar statement holding for $LLR^{-1}$). To map this number back to a probability space, compute $$LLR^{-1}(\text{sum}\_\{i=1\}^{\{K\}}wi\ LLR(r(ci))) \quad (4)$$

The function g(.) that is used in the equation (2) above to compute the weights can be defined as follows. Suppose that g(x) is set to equal 1/x, and suppose that f(.) in equation (1) above is set to be $f(x,s)=0$ if $x=0$ and $f(x,s)=1$ if $x>0$. Then, the vector v is simply representing how many concepts exist in the vicinity of a concept (disregarding the initial confidence score), however tenuous the connection may be. In previous example, ["vanilla yogurt", "superman", "superman", "superman", "the green lantern", "batman and robin", "wonder woman", "aquaman"] the an assignment for the values in vector v can be:

v("vanilla yogurt")=1
v("superman")=7
v("the green lantern")=7
v("batman and robin")=7
v("wonder woman")=7
v("aquaman")=7

The v("superman")=7 is derived from the fact that there are 7 concepts in that list that are at least moderately related superman. Similar statements can be made for the rest of the concepts above.

As a consequence, the choice $g(x)=1/x$ in equation (3) above is effectively uniformly weighting clusters of concepts extracted from the document, no matter how many different concepts there are in the cluster. Specifically, and using the example above, the document can be integrated using the computation:

$$r(\text{"vanilla yogurt"})+\frac{1}{7}r(\text{"superman"})+\frac{1}{7}r(\text{"superman"})+\frac{1}{7}r(\text{"superman"})+\frac{1}{7}r(\text{"the green lantern"})+\frac{1}{7}r(\text{"batman and robin"})+\frac{1}{7}r(\text{"wonder woman"})+\frac{1}{7}r(\text{"aquaman"})$$

The embodiment of the assignment above does not account for concept reinforcement and verbosity as described earlier. This is because the entire set of 7 comic related concepts, given that they are each being weighed down by a factor of 7 do not contribute as an ensemble any more than the "vanilla yogurt" concept does. It may be desirable to increase the $\frac{1}{7}$ weight to some other larger number. This discussion is purely meant to demonstrate that a variety of different behaviors are possible within the scope of embodiment. In the following text, a technique is described that accounts for concept reinforcement and verbosity in accordance with an embodiment.

In one embodiment, g(x) is assigned to equal h(x)/x for some function h(x) that is growing with x, and that satisfies (for example) $h(1)=1$. That way the factor in front of r("vanilla yogurt") remains 1.0, while the factors in front of the other concepts will be larger than currently assigned. The function h(x) then is set to grow slower than linearly with x, for example, $h(x)=x^u$ for some u $0<u<1.0$. This general class of functions falls within the scope of our embodiments and also account for reinforcement and verbosity. The reason for the slower than linear growth for h(x) is that assigning $h(x)=x$ (hence $g(x)=1$) also defeats the initial purpose as then the weights become r("vanilla yogurt")+r("superman")+r("superman")+r("superman")+r("the green lantern")+r("batman and robin")+r("wonder woman")+r("aquaman") and then the comics related concepts effect in the overall unified concept space view of the document is unreasonably large.

The computation shown above in Equation (4) is performed for some weights w1 . . . wk that are derived in ways as described above. This computation is a vector with N entries, since each of the r(ci) is also a vector with N entries. Recall that this vector encodes the likelihood that a concept ci is related to each other concepts in a concept graph. Additionally, note that the concept graph was used both in the computation of r(ci) (via the Markov chain techniques described earlier) as well as in the computation of the updated confidence scores wi. In general, the concept graph can be used to improve one but not the other; however the example above includes both for completeness. The result of Equation (4) is the a posteriori likelihood inferences sought by embodiments, as it connects the document to all other concepts in a concept graph by processing the a priori data with the concept graph information.

An alternative embodiment can be utilized for processing the a priori information about the document and producing the a posteriori likelihoods relating a document other concepts. An advantage to this embodiment is that it can allow processing of an arbitrary large set of concepts in a document with a finite amount of memory in the processing system. Another advantage is that it is able to differentiate in the final a posteriori likelihood vector the contributions on the concepts explicitly present in the document as per the initial concept extraction. The fundamental idea is to choose, for every concept $1<=j<=N$, the top M extracted concepts closest to the concept j. Then, the likelihood that each of these top M concepts are related to the concept j is combined using information combining mechanisms. Finding these top M concepts can be done by processing the concepts c1, . . . , ck sequentially. The second key idea is that in the output likelihood vector, the K concepts c1, . . . ck receive a special treatment beyond the above. This is important so as to ensure that document queries that contain an extracted concept that is also a query are ranked appropriately.

In the alternative embodiment, it is assumed assume that there is a preprocessing stage that eliminates repeated concepts and keeps counts n1, . . . , nk that reflect how many times these concepts repeat and the confidence scores with which they appear. Furthermore r(ci) is modified with a function that is monotonic with these counts and scores. For the sake of the description of this embodiment, concepts with their respective index are identified in the vector for N concepts. So, in particular ci is an integer for $1<=i<=k$. For each concept ci in $\{c1, \ldots, ck\}$ the contribution to the a posteriori likelihood for each of the N concepts in the concept graph can be computed as follows. Suppose that j is one of the N concepts in the concept graph (resulting in j\in\{1, . . . , N\}). If ci==j then a "direct hit", then contribution to the a posteriori likelihood of cj is computed as $$\text{direct\_}\{j\}=\text{lambda\_}d\ r(j)[j]+\text{gamma\_}d$$

If ci !=j, then a "side" contribution to the a posteriori likelihood of j is computed as follows. The contribution is given by $$y\_\{i,j\}=\text{lambda\_}s\ r(ci)[j]+\text{gamma\_}s$$

The compounded contribution of the "side" hits is computed by selecting the highest M among the list [y_{1,j}, y_{2,j}, . . . , y_{k,j} ], computing their likelihood ratios, multiplying them, and then computing the likelihood value side_j from the resulting likelihood ratio.

In the case that concept j does not appear in $\{c1, \ldots ck\}$, the final a posteriori likelihood for concept j can be given by:

$$z\_j=a\_side\ side\_j+b\_side$$

In the case that concept j DOES appear in $\{c1, \ldots ck\}$ then the final a posteriori likelihood for cj can be given by:

$$LR^\wedge\{-1\}(LR(z\_j)LR(\text{direct\_}j))$$

In additional embodiments, lambda_d, gamma_d, a_side, b_side can vary with i as a function of the popularity of the concept ci.

Figure 5:
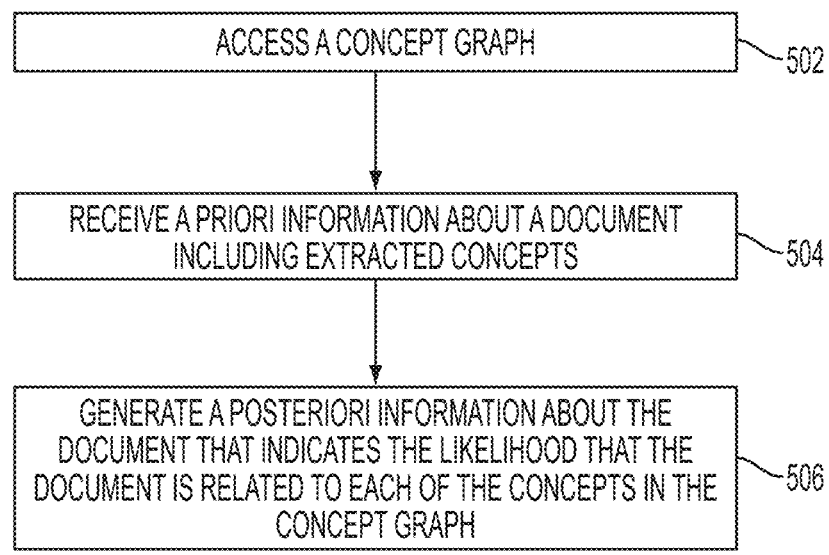
FIG. 5 depicts a process for computing the relevance of a document to concepts not specified in the document in accordance with an embodiment.

Turning now to FIG. 5, a process for computing the relevance of a document to concepts not specified in the document is generally shown in accordance with an embodiment. At block 502, a concept graph is accessed. At blocks 504 and 506, a relevance of the document to concepts in the concept graph is computed. At block 504, a priori information about a document is received. The a priori information can include concepts previously extracted from the document. The a priori information can also include confidence scores corresponding to each of the concepts extracted from the document.

At block 506, a posteriori information about the document is generated that indicates the likelihood that the document is related to each of the concepts in the concept graph. The a posteriori information can be generated by combining the a priori information and the concept graph. The a posteriori information can be responsive to paths connecting each of the concepts in the concept graph to each concept in a selected subset of the concepts extracted from the document. The selected subset of the concepts extracted from the document can vary based on the concept in the concept graph and can include a specified number of the concepts extracted from the document that are the most related to the concept in the concept graph. The a posteriori information can include a weighted averaging of vectors associated with extracted concepts. The weight for an extracted concept can be responsive to a degree to which the extracted concept is related to the other extracted concepts and/or to a frequency in which the extracted concept appears in the document.

A relevance of the document to concepts not extracted from the document can also be computed. The document can be in a corpus of documents and the processing can further include utilizing the a posteriori information to search the corpus of documents. The process can also include outputting a threshold number of concepts from the concept graph having the highest likelihood, the output based on the results of the combining.

Embodiments described herein further include the use of efficient data structures for storing and querying deep conceptual indices. As described previously, a document can be received, concepts extracted from the document, confidence scores calculated for the various concepts (with the goal of, for example, promoting concept reinforcement and creating diminishing returns by penalizing exceedingly verbose descriptions), and then a representation of the document is created in a concept space that connects the document to all possible concepts (not only the ones that were found explicitly in the document). Embodiments described herein are directed to how this information can be organized in a computer system so that it can be efficiently queried against and maintained. A query can typically be formed by specifying a concept or a set of concepts in a user interface directly or indirectly by stating a query in natural language from which concepts are then extracted.

In embodiments one or more concepts can be selected as the query. For ease of description herein, it is assumed that a single concept q has been selected as the query. The computational task involved in an embodiment is that of examining the score that has been assigned to every document for the query q, and returning the documents in the order implied by that score. This can be achieved by building an inverted table that maintains for every concept, a list of documents and associated their score. This allows for quick retrieval of this list upon receiving the query concept. The inverted table utilized by embodiments described herein is of a very different nature than inverted tables used in traditional information retrieval mechanisms, where for every keyword (or generally some text surface form) a list of documents containing that keyword is listed. Some fundamental differences include that instead of keywords, the abstract notion of a concept is used, which is defined in embodiments as a node in a conceptual graph; and that a document is associated with a variety of concepts that are not present in the document to start with. The list of documents can be maintained in sorted form (e.g., sorted by score) and can be organized as a hash table as well, where they key is the document and the value is the score.

In an embodiment of the conceptual indexing technique described herein, a document is associated with potentially a large number of concepts, and hence it can become important to design and use data structures that are capable of very fast insertion, deletion and updating of scores. In particular, in order to be able to very quickly invalidate previous scores of a document, the notion of conceptual index versioning can be introduced. Scores can be augmented with a version number, and an additional metadata structure can be added to tracks what is the most recent version of a document. Incrementing the version number results in automatically and immediately invalidating all the scores of a document in the inverted table with a version number lesser than the new version number.

The conceptual index versioning system described above can also allow a seamless experience in transitioning scores for a document to new scores. This can be accomplished as follows: the new scores for the document are uploaded with the new version number, however the version number for the document indicated in the metadata is not updated until all the scores for the new version have been added to the inverted table. The inverted hash table data structure can also be augmented with a garbage collection mechanism which periodically deletes concept scores of versions that are no longer valid in the system. In addition, the garbage collection mechanism can delete scores (even if current, matching the existing version) starting from the lowest scores, whenever there is existing or predicted space pressure in the table.

An example of the indexing follows. Assume that a conceptual index needs to be created for the following two documents:

D1="Vanilla ice cream is boring" and
D2="Induction cooking is all the rage these days."

After extracting concepts from D1, "Vanilla ice cream" is obtained and after extracting concepts from D2, "Induction cooking" is obtained.

Now suppose, for the sake of the discussion, that the space of possible concepts that are being considered is:

["Vanilla ice cream", "Induction cooking", "Kitchen", "*Vanilla Planifolia*", "Dairy", "LCD screen"].

Note that in practice, a concept space is typically much larger and often in the order of millions to hundreds of millions of concepts. Now, using the techniques described previously, scores can be determined for D1 and D2 for the space of concepts. For example:

Scores for D1 can equal {{"Vanilla ice cream": 1.0}, {"Induction cooking": 0.2}, {"Kitchen": 0.3}, {*"Vanilla Planifolia"*: 0.9}, {"Dairy": 0.9}, {"LCD screen": 0.001} }; and Scores for D2 can equal {{"Vanilla ice cream": 0.1}, {"Induction cooking": 1.0}, {"Kitchen": 0.8}, {*"Vanilla Planifolia"*: 0.01}, {"Dairy": 0.15}, {"LCD screen": 0.1}}.

In this example, the conceptual inverted table would read:
"Vanilla ice cream": (D1, 1.0, v1) (D2, 0.1, v1)
"Induction cooking": (D2, 1.0, v1) (D1, 0.2, v1)
"Kitchen": (D2, 0.8, v1) (D1, 0.3, v1)
*Vanilla Planifolia*: (D1, 0.9, v1) (D2, 0.01, v1) "
Dairy": (D1, 0.9, v1) (D2, 0.15, v1)
"LCD Screen": (D2, 0.1, v1) (D2, 0.001, v1)

In a separate metadata structure, the current version number for the scores of the documents can be indicated as {"D1": v1, "D2": v1}.

Now suppose that D2 is updated to read "Induction cooking is all the rage these days!! In my kitchen remodeling, I additionally plan to have a fridge with an LCD screen." Then the new scores for D2 may become:

Scores for D2={{"Vanilla ice cream": 0.1}, {"Induction cooking": 1.0}, {"Kitchen": 1.0}, {*"Vanilla Planifolia"*: 0.01}, {"Dairy": 0.15}, {"LCD screen": 1.0}}

Then, the new scores can be inserted into the conceptual inverted table resulting in:

"Vanilla ice cream": (D1, 1.0, v1) (D2, 0.1, v1) (D2, 0.1, v2)
"Induction cooking": (D2, 1.0, v2) (D2, 1.0, v1) (D1, 0.2, v1)
"Kitchen": (D2, 1.0, v2) (D2, 0.8, v1) (D1, 0.3, v1)
*"Vanilla Planifolia"*: (D1, 0.9, v1) (D2, 0.01, v1) (D2, 0.01, v2)
"Dairy": (D1, 0.9, v1) (D2, 0.15, v1) (D2, 0.01, v2)
"LCD Screen": (D2, 1.0, v2) (D2, 0.1, v1) (D2, 0.001, v1)

Note that in the above the list is kept in ordered form, however in other embodiments, the list is not kept in ordered form.

After the update above happens, then the version of the documents are updated to reflect {"D1": v1, "D2": v2}.

When accessing the inverted table below, the document scores for D2 that do not match v2 can be discarded. A garbage collection mechanism can then scan the conceptual inverted table above and delete entries that are no longer current, leaving:

"Vanilla ice cream": (D1, 1.0, v1) (D2, 0.1, v2)
"Induction cooking": (D2, 1.0, v2) (D1, 0.2, v1)
"Kitchen": (D2, 1.0, v2) (D1, 0.3, v1)
*"Vanilla Planifolia"*: (D1, 0.9, v1) (D2, 0.01, v2)
"Dairy": (D1, 0.9, v1) (D2, 0.01, v2)
"LCD Screen": (D2, 1.0, v2) (D2, 0.001, v1)

Embodiments can be utilized for queries that include multiple concepts. Multiple concept queries can be present when a user explicitly (or implicitly, via the use of natural language) describes two or more concepts with the hope of retrieving documents that are relevant to a reasonable fraction of the given concepts. Another multiple concept query scenario is when a user introduces a *document* as an example query, and in this case the concepts that are included in the document can be used to formulate a multiple concept query. Yet another scenario is when documents and concepts are mixed as a query.

The following text describes several approaches to using the conceptual indexing system described above in the context of multiple concept queries. A common thread throughout these approaches is that an M concept query (where M is some positive integer) will result in M independent lookups in the conceptual inverted table. There are several ways to combine the results of such lookups. One way to interpret a request for an M concept query is that the requestor wants to obtain a ranking of the documents which promotes documents that would have shown up with high confidence scores independently in the list of results of the separate M queries for the M individual concepts.

Mathematically, if there is a list of documents [D1, D2, D3, . . . , DL], and as a result of a query for a single concept $c_i$ (i=1 . . . M) the scores $[s_{i,1}\ s_{i,2}\ s_{i,3}\ \ldots\ s_{i,L}]$ are obtained, one can obtain a unified scoring for a query for all M concepts by an averaging (straight or weighted) of all the M row vectors above. In some cases nonetheless, the information retrieval system may not be fully calibrated and as a result the various vectors in [s_{i,1} s_{i,2} s_{i,3} ... s_{i,L} ] may not be compatible with each other. For example, a score of 0.8 for a query on "information retrieval" may imply a different relevance than a score of 0.8 for a query on "Federal Housing Administration", even for the same document. As a result, in these instances an averaging, whether weighted or not, of the vectors in [s_{i, 1} s_{i,2} s_{i,3} ... s_{i,L} ] can lead to undesirable or unexpected outcomes in the combined ranking. One technique for improving this potential problem is to compute, for every i=1 ... M, the rank of elements of [s_{i,1} s_{i,2} s_{i,3} ... s_{i,L} ] after sorting, and then to average the ranks themselves, instead of the scores directly.

An example follows for the purposes of clarifying the computation technique for the combined scores. Suppose that a combined search is being performed for two concepts in L=4 documents D1, D2, D3, D4, and suppose that the scores obtained are concept1 [0.4 0.8 0.0 1.0] concept2 [0.7 0.1 1.0 0.3] respectively. By sorting the scores from highest to lowest for each query and noting the resulting index, concept1 [3 2 4 1] concept2 [2 4 1 3] is obtained.

If one were to use an averaging of the rows in [s_{i,1} s_{i,2} s_{i,3} ... s_{i,L} ] directly then one would obtain for the combined scores [0.55 0.5 0.5 0.65] where higher is better. If the ranks were used instead, then averaging the ranks would result in [2.5 3 2.5 2] where lower is better.

In some situations, it is desirable to find documents that are related to other documents. This is referred to as a query in which a document-by-example is provided. These queries are nothing other than conceptual queries, since the document that is being used as a query can be analyzed, extracting one or more concepts from this document and using those concepts in the query. In an embodiment, for a multiple concept query with document-by-example, the document is first analyzed to extract a list of concepts for the document that are deemed to be highly relevant, and then using the techniques previously described can be used to perform a multiple concept query. Embodiments deduce the identity of the important concepts in a document by restricting the concepts to be considered to be only those initially extracted from the document. Nonetheless, the entire concept graph is used to analyze how these concepts relate/reinforce each other, using the techniques described previously herein. The results of that scoring are then used in order to select the top concepts to be used in the multiple concept query.

Figure 13A:
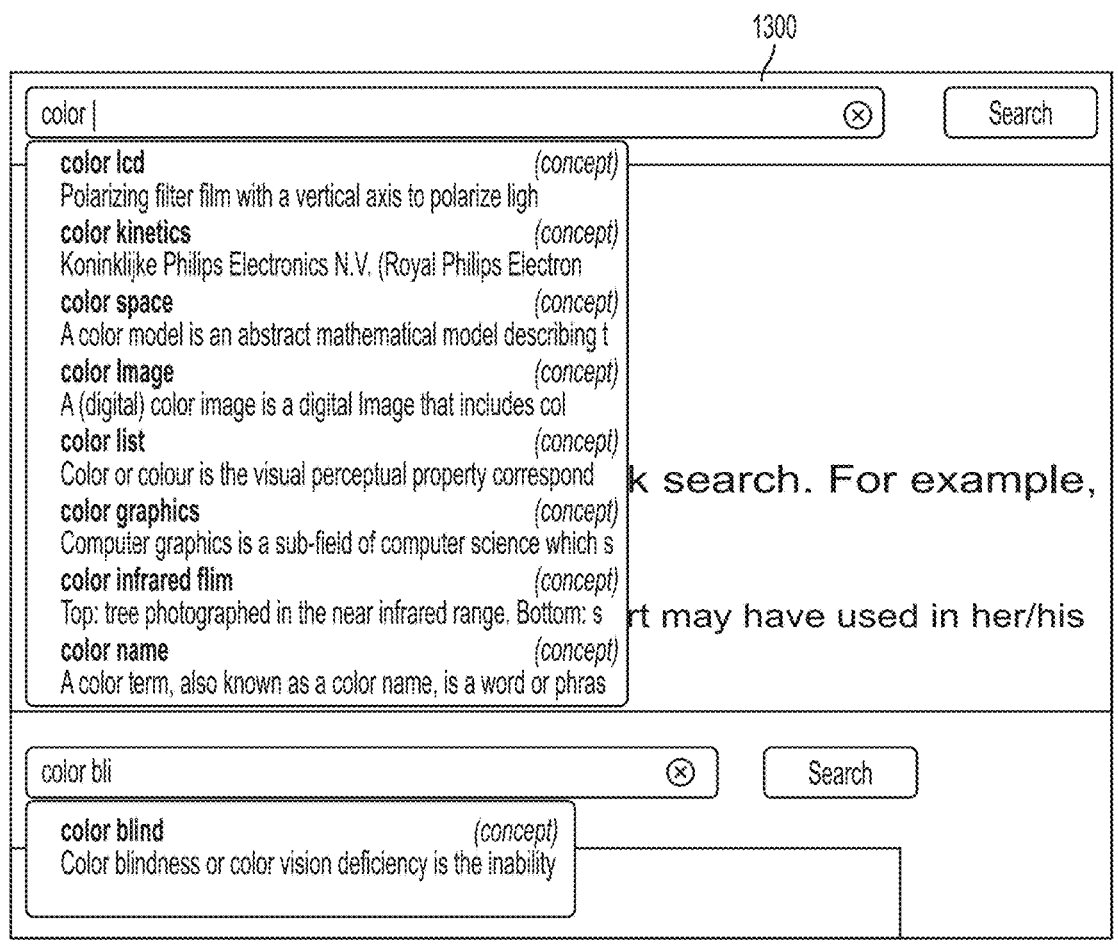
FIGS. 13A, 13B, and 13C depict a user interface for searching and receiving search results in accordance with an embodiment.
Figure 13B:
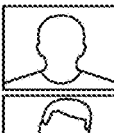
Figure 13C:

Because the fundamental entity in the query is a concept, and documents in the document-by-example are simply converted into a one or more concept query, it is also possible to create queries that combine concepts and documents simultaneously, as shown in FIGS. 13B and 13C below. Suppose for example that the query has exactly one document and one concept being specified. In the example of an expertise locator, it may be the name of a person, and an additional concept to further sharpen the query. Suppose the person is associated with a document, which in turn is associated with 50 concepts. The top C (e.g., C=10) concepts for that person are selected and then a document-by-example query is made using the person as an example. This results in a list of documents from the system. In addition, the single concept query is made separately, resulting in a second list. Finally, these lists are joined using some criterion. The criterion described above which combines various lists by averaging the ranks of the items in the list may be used as a joining algorithm.

Figure 6:
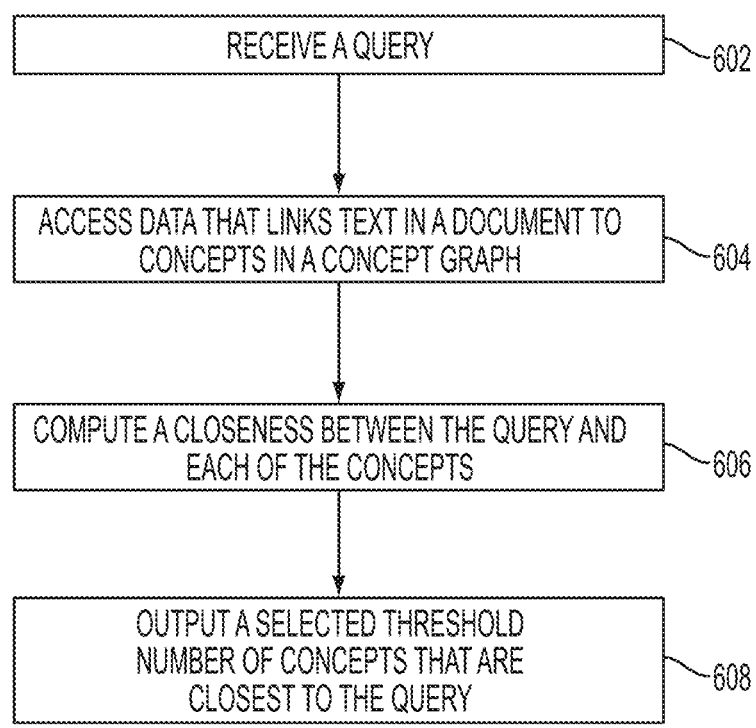
FIG. 6 depicts a process for storing and querying conceptual indices in an inverted table in accordance with an embodiment.

Turning now to FIG. 6, a process for storing and querying conceptual indices in an inverted table is generally shown in accordance with an embodiment. At block 602, a query is received, and at block 604, data is accessed that links text in a document to concepts in a concept graph. At block 606, a measure of closeness between the query and each of the concepts is computed, and at block 608, a selected threshold number of concepts that are closest to the query are output. In an embodiment In an embodiment, a method can include creating a conceptual inverted index based on conceptual indices. The conceptual inverted index includes conceptual inverted index entries, each of which corresponds to a separate concept in a concept graph.

For each conceptual inverted index entry, the creating can include, with respect to the concept corresponding to the conceptual inverted index, populating the conceptual inverted index entry with pointers to documents selected from the conceptual index having likelihoods of being related to the concept that are greater than a threshold value and the corresponding likelihoods of the documents.

The method can also include receiving a query that includes one of the concepts in the concept graph as a search term, searching the conceptual inverted index for the search term, and generating query results from the searching. In an embodiment, the query includes a plurality of concepts as the search term. The query results can include at least a subset of the pointers to documents. In an embodiment, the subset includes pointers to those documents having likelihoods greater than a second threshold of being related to the concept included in the search term. In an embodiment, the query results can include a pointer to a document that does not explicitly mention the search term.

Each of the conceptual indices can be associated with a corresponding one of the documents and includes a conceptual index entry for each concept in the concept graph, and each of the conceptual index entries specifies a value indicating a likelihood that the one of the documents is related to the concept in the concept graph. In an embodiment, a conceptual index entry can indicate that a document is related to a concept in the concept graph that is not mentioned in the document. The concept not mentioned in the document can be related to the concept included in the query. In an embodiment, a document is related to a concept in the concept graph if a concept extracted from the document is connected to the concept in the concept graph via a path in the concept graph.

In an embodiment, each document is associated with a valid version number and generating query results includes verifying that any pointers to documents correspond to documents that match the associated valid version numbers. Pointers to documents that do not match the associated valid version numbers can be removed from the conceptual inverted index.

The various embodiments described in here can be assembled to build a full end-to-end system that includes the ingestion of a collection of documents into a system and the mechanisms for using this system through a user interface. It is important to note that even though fundamentally the same system can be applied to different kinds of documents, the nature of the documents ingested into the system can dramatically change the intended use for the system. For example, if the documents ingested are news sources, then the system can be used for the exploration and recommendation of news content. If the documents ingested are patents, then the resulting system can be used for prior art search. If the documents ingested are the descriptions of the expertise of a patent examiner, then resulting system can be used for recommending which patent examiners to use for a given patent application. If the documents ingested are descriptions of the expertise of a body of researchers in an organization, the resulting system can be used to as an "expertise locator" to help locate skills in an organization with the goal of making its processes more efficient.

To describe the end-to-end system, it is assumed that there is a collection of documents for which conceptual exploration is desired, or for which conceptual searches are desired, or from which a selection is made in order to provide recommendations given some context or query. Throughout this description, numerous instances are described regarding the capability of linking text to concepts in a concept graph. In one step, the text of each document is passed through the module which links the document (and specific words within the document) to concepts in the concept graph. Confidence scores about these linkages may be produced by this step. The links and the possible confidence scores can constitute the a priori information known about each document. Optionally, the concept graph may be augmented prior to this step by analyzing the documents as a reference corpus. Extraction of candidate new concepts from this reference corpus may happen by extracting noun phrases from this reference corpus. These noun phrases can then be regarded as a string of text for which a new concept definition may be considered. The process of analyzing a string of text for this goal has been described elsewhere herein.

In another step, the a priori information for each document can be analyzed in conjunction with a concept graph in order to obtain a representation of the document in a concept space, obtaining a posteriori information for each document. This analysis is described elsewhere herein.

After this step, the data produced so far is organized in a "conceptual" reverse index (or conceptual inverted index) which allows the fast retrieval of relevant documents given a conceptual query. In addition to this reverse index, the system may produce an explanations index that can be used to help construct explanations to a user about the relevance of a document to a conceptual query. The mechanisms for building and maintaining these indices are described elsewhere in this embodiment. As an alternate to producing an explanations index, the explanations can be computed on the fly at the same time the query is made, as described in this embodiment.

After the analysis is complete, the system exhibits a user interface in which an input can be entered. The input mechanism can allow the user to specify one or more concepts from the concept graph, one or more documents (so that similar documents can be returned), or a combination of both. Alternately, a plain string of text may be entered, which is then passed to a mechanism that extracts concepts from it such as the text to concept graph linker described in this embodiment.

After having input a query and a collection of concepts made available to the system, which is referred to herein as a conceptual query, the system proceeds to lookup the concept based reverse index to find documents that are relevant to the one or more concepts in the query. As the reverse index is organized as a table that is looked up via single concept queries, multiple lookups are made and these lookups are aggregated to form a single presentation.

The documents returned are presented with an explanation of why they are relevant to the query by emphasizing those concepts within the extracted concepts in the document that are most relevant to the query and/or showing related text containing those concepts. Additionally, the documents themselves maybe clustered in groups of documents that relate to the query in similar ways, as described earlier in this embodiment. The various concepts being emphasized may also be presented with a hyperlink; clicking on this hyperlink may have the effect of changing the query to include the clicked concept.

The following text describes an end-to-end system for building an expertise locator.

Described below are embodiments of system for creating and searching a repository of professional skills and interests that can be built using embodiments of the semantic searching techniques described herein. Embodiments can provide a user interface for summarizing the relevance of a document to a query. In addition, embodiments can provide a system for searching, recommending, and exploring documents through conceptual association.

In the example embodiment described below, the system is referred to herein as the "Researcher System" and it can serve as an external and/or internal Web face for people and projects across a corporation's (or other group) research locations (or other types of locations). Embodiments can support a technique for automatically extracting and using Wikipedia based concepts from the Researcher System's underlying content store to support the finding of potential experts through the novel forms of fuzzy matching described herein. In addition, the Researcher System can simplify content creation and linking in order to make it easier for researchers (or other types of employees) to describe their professional skills and interests and, in so doing, to make them easier to find. Embodiments also include searches and user interfaces for finding researchers that are conceptually related to a query despite the absence of string matches between the query and the underlying repository.

In the example embodiment described herein, the Researcher System contains descriptions of nearly 2,000 professionals, along with their projects, tens of thousands of their papers and patents, and descriptions of their personal interests. Key aspects of the Researcher System are described herein including how its design supports rapid authoring, by individual researchers without central editorial control, of relatively coherent and richly linked content.

Also described herein is the use of the content in the Researcher System as a source of high value information about peoples' skills and interests. An example shows how embodiments can be used to efficiently index this repository and map search queries to this index to find people with related skills and interests. Unlike systems relying on explicit tag creation or fixed ontologies, embodiments include the ability to automatically create something like tags using the conceptual space provided by Wikipedia. Terms within search queries are mapped to concepts within this space and the conceptual distance from the query to all the people in the repository is computed.

In embodiments of the Researcher System, individuals can create any HTML content that they desire, from simple text to complex and interlinked structures, all of which is embedded at display time into a uniform set of templates. Dense networks of links between people and projects are encouraged both by example and semi-automatic and automatic link creation. Once authored and previewed, content is immediately published to the open Web without editorial review to support rapid iteration and provide immediate reinforcement.

Embodiments of the Researcher System create characterizations of skills and interests by automatic analysis of textual content. These characterizations make use of the vast collection of over five million concepts currently found within Wikipedia. Since each concept is extremely unlikely to be directly associated with any one person, embodiments make use of Wikipedia's link structure to find concepts near the concepts in a query. And, once a potentially relevant person is found, the Researcher System can facilitate navigation to other related people, helping the searcher find people who might also be of interest. To accomplish this, the use of various components described in this invention may be employed. First, an automatic linking of the text describing the researchers to a concept graph derived from Wikipedia is performed. The text of these researchers is processed to discover new concepts that may be added to the concept graph. The information about the automatic linking, which is regarded as as "a priori" information about the documents, in combination with the concept graph, is used to associate each of the documents (representing a person) to each concept in a concept graph, thus obtaining the representation of the document in a concept space.

In embodiments of the Researcher System, searches are based on concepts expressed using a search tool outlined below. Recall is substantially improved by this technique since many concepts tend to lie near the concept or concepts expressed in the query and many people tend to have many associated concepts near these same concepts. This rich fuzzy matching almost always results in a set of relevant people being returned.

Embodiments of the Researcher System also provide, for ease of content authoring and immediate publishing of external content in order to facilitate growth in the number of pages and increased page freshness. Embodiments also provide for links between people to enhance navigation in the Researcher System. Thus, once a searcher finds a person of interest, crosslinks to related people or projects are also found. Embodiments provide ease of crosslink creation (including automatic crosslink creation where possible).

Turning now to FIGS. 7-10, primary views (user interfaces) of people and projects in a deployment of the Researcher System are generally shown in accordance with embodiments. Embodiments support both internal views (limited to those inside the corporation) and external views (visible to all).

Figure 10:
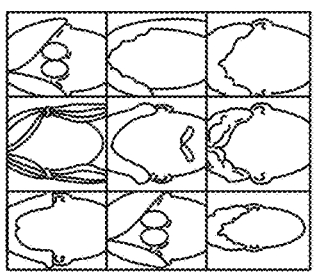
FIG. 10 depicts a user interface of a portion of a researcher project page in accordance with an embodiment.

FIG. 7 depicts an external view of a user interface 700 of a researcher profile in accordance with an embodiment. As shown FIG. 7, photo, name, job role, location, and contact information are displayed at the top with the email address and phone number being rendered in a way that makes scraping for spam purposes prohibitively expensive, if not impossible. In FIG. 8, a user interface 800 illustrates a Profile Overview, Publications Page, and Patents Page associated with the researcher and are arrayed as a collection of tabbed pages. Other tabs may be created to hold additional content, as shown in FIG. 10 (e.g., Risk Perception"). The Profile can contain any HTML content, created using an editor shown in FIG. 11. In this fairly typical example, links to related information, both information hosted in a repository of the Researcher System and that residing elsewhere on the open Web, are included in the Profile description.

Semi-automatically created links to related information are displayed along the left hand column of the user interface 700 in FIG. 7. Linked Project Pages are shown first, followed by Professional Interests (which include both high-level disciplines such as Computer Science or Physics, and then topical interests such as Human Computer Interaction). Links to Professional Associations (such as ACM) are shown last. This order can result in putting links to conceptually nearby people in positions of higher prominence on the user interface.

Turning now to FIG. 8, the user interface 800 provides an external view of a portion of this researcher's publication page in accordance with an embodiment. Publications can be added using a mechanism such as that shown in FIG. 12 below and can be automatically sorted by year. Abstracts, when available, can also be automatically pulled from external digital libraries. Links to these external documents, and links to co-authors pages can also be automatically inserted. This support quick navigation to both a paper and its collaborating authors.

Figure 9:
FIG. 9 depicts a user interface of an internal view of a portion of a researcher patent page in accordance with an embodiment.

Turning now to FIG. 9, a user interface 900 of an internal view of a portion of this researcher's Patents page is shown in accordance with an embodiment. Internal, in this case, means that the viewer is known (by various automatic means) to be an employee of the corporation. Note that the internal view of content shown in FIG. 9 differs from the external view shown in FIG. 8 in two ways. First, content that is not yet externalized is highlighted in red. This alerts the internal viewer that the content either needs additional work or simply needs to be externalized using the editor. Second, an "Edit Patents Page" button is displayed if the internal viewer is also known to be the owner of the content. This makes access to the associated page editor only a single click away.

Project pages are rendered in a fairly similar fashion to people pages. FIG. 10 shows a user interface 1000 of a portion of one of this researcher's projects in accordance with an embodiment. The user interface 1000 shown in FIG. 10 is an internal view of a project page showing the "join/edit group" button in accordance with an embodiment. The upper left of the page holds an optionally displayed photomontage of all group members, allowing direct navigation to project collaborators. Tabs for the project Overview and an optional Publications page can also be provided by default. Other tabbed pages can also be added to provide additional information (in this case, a page on Risk Perception).

FIG. 10 shows the internal view of this project, in particular, the view provided to an internal corporate employee who is not currently in the project. As such, a "Join/Edit Group" button is displayed making it trivially easy to join the project and have it automatically linked to the viewer's personal page. This mechanism encourages the creation of crosslinks facilitating navigation and the understanding of explicitly related people. A discussion of implicitly related people follows in a later section on concept-based people indexing and search.

Figure 11:
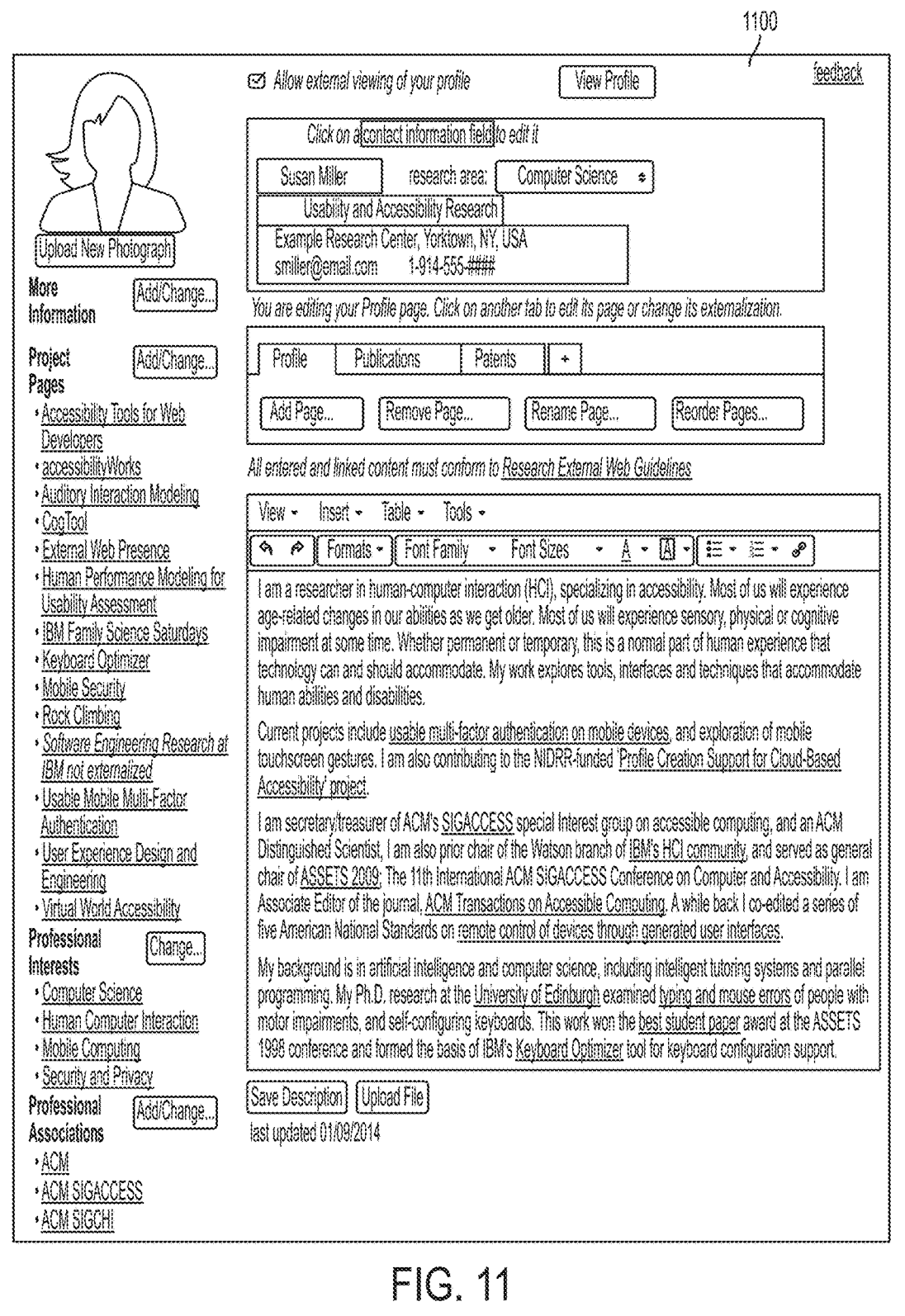
Figure 12:
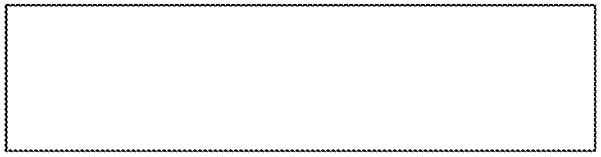
FIG. 12 depicts a user interface for a portion of an editor for a researcher publication page in accordance with an embodiment.

FIGS. 11 and 12 show how content (beyond the links to related content discussed above) can be authored in an embodiment of the Researcher System. Turning now to FIG. 11, a user interface 1100 of an editor for a researcher's profile page is generally shown in accordance with an embodiment. FIG. 11 shows the primary Profile editor that can be restricted to only being available to the particular researcher and/or to their designee. In the embodiment shown in FIG. 11, buttons to preview and externalize the page appear at the top of this page and can also appear at the top of every content creation page. It should be noted that the editor shown in FIG. 11 has a close relationship to the external view. Content layout is essentially the same as in the view with only a few additional editor controls surrounding each major section. This helps ensure that the resulting view is easily visualized during editing. In addition, embodiments include the provision of both a "View Profile" button (for previewing) and an "Allow external viewing of your profile" checkbox that makes the content immediately visible on the open Web. This can help motivate people to make quick updates rather than waiting for some major change or batching their smaller updates because of a slow process of staging and vetting.

Still referring to the user interface 1100 of FIG. 11, edit controls allow the researcher photo on the left, and the name, job role, location, and contact information on the right to be easily updated. When a page is first created, both the researcher's photo and this top-level information can be automatically extracted from a corporate lightweight directory access protocol (LDAP) server to simplify page creation. Future editing sessions can update this information from the server as needed unless the owner explicitly changes this content. Reasons for changing the job role from what is stored in the LDAP server can include, for example, the addition of a university affiliation not captured in the LDAP record. Reasons for changing the location include, for example, specifying geographic information for a remote worker who is nominally associated with one of the global research laboratories but is actually physically located somewhere else.

Directly below the contact information in the user interface 1100 of FIG. 11 is an edit control supporting the addition, deletion, renaming, and reordering of tabs (and their associated pages). In an embodiment, for cross-site consistency, Profile, Publications, and Patents pages cannot be moved or renamed. Publications and Patents pages can be made optional, however, but their use is encouraged both by the ease of creation afforded by the editor shown in FIG. 12 and by the provision of individual and manager views of citation counts that require a paper to be indexed in the repository.

Below the tab control in the user interface 1100 of FIG. 11 is the what-you-see-is-what-you-get (WYSIWYG) editor for Profile page content. In an embodiment, the editor uses a tool such as TinyMCE with only a few modifications to limit the feature set and keep authored headings appropriately situated within the final generated page structure. To further ease content creation, the tool can also be used to convert previously authored content (say from a LinkedIn profile or a CV file) to HTML.

In the left column of the editor shown in the user interface 1100 of FIG. 11 is the list of Projects, Professional Interests, and Professional Associations, along with edit buttons for each. Projects, as noted above, are generally added by clicking on a "Join" button when viewing the project itself. But it is also possible to see and select from a list of all projects by clicking on the "Add/Change" button. New projects can also be created in this way. Similarly, the "Add/Change" button for Professional Associations allows the viewing and selection from among more than 200 previously entered Professional Associations (along with the creation of new ones). Professional Interests differ from these two categories in that it is only possible to select from a fixed ontology of around 40 high-level disciplines and interest areas. Each discipline and interest area already has a page in the system that is edited by the area owner to ensure it depicts the area (e.g., Human Computer Interaction) appropriately.

Above these lists shown in the user interface 1100 of FIG. 11 is an optional More Information section for any links that are thought by the author to be best displayed as a simple list. This section can also serve as an overflow area for any page tabs that cannot be rendered within a single row (a rare occurrence).

While there may be several other auxiliary editor components in embodiments of the Researcher System, only one more (the Publications page editor) will be discussed herein as it can be both a driver of content for expertise location and a source of automatically generated crosslinks between people.

Referring now to FIG. 12, a user interface 1200 for a portion of an editor for a researcher's publications page is generally shown in accordance with an embodiment. Publications can be found in the Researcher System by the researcher clicking on the "Find Publications and Patents" button above the list of their publications (if any) selected during previous searches. A dialog allows the retrieval of publications from an external repository and the selection of those that actually belong to them. Descriptions of papers can be changed if errors are found or additional information needs to be added. Finally, papers not yet indexed by the external repository can be added manually if desired.

An embodiment is not fully automated because it may require explicit selection from a list of possible papers, to account for the difficulty of unambiguously identifying authors in current external paper repository implementations. However, this process takes only a few minutes, even for researchers with a large number of publications and patents. Once a paper or patent is identified, the automatic provisioning of available abstracts, keywords, paper links, and crosslinks between co-authors and co-inventors makes this modest investment worthwhile. Anther embodiment can be fully automated when repositories are used that have unique author identifiers and the provision of suitable APIs by external paper repositories may eventually make this feasible.

Embodiments of the Researcher System utilize the semantic searching technologies described herein. This can extend a rudimentary text search capability that allows finding people by portions of their name, their nickname, and so on (along with a faceted search for finding people by disciplines and laboratories), to allowing people to be found based on the similarity between the concepts mentioned in their Researcher pages and the conceptual content of a query.

An example of finding things conceptually related to a query using embodiments of semantic searching techniques described herein follows. For example, a person may be trying to find someone in a research population who knows something about color blindness. FIG. 13A shows a user interface 1300 of the result of typing "color blindness" into a search field. FIGS. 13B and 13C, as described previously depict how queries that combine concepts and documents simultaneously are created.

Turning back to FIG. 13A, as characters are typed, the list of candidate concepts shrinks until the concept of interest is found. Selecting this starts the search process.

Within a few seconds, a set of possible researchers is returned, ranked in decreasing order of conceptual closeness (described below). In order to accomplish this retrieval task, reverse index technologies described herein may be employed. A portion of this result set is shown in the user interface 1400 of FIG. 14. There are things to note about this result set. First, examination of the Researcher System website shows that none of these people explicitly mention "color blindness" in any of their content. Thus, a search based on string matching would not find them. Second, the word cloud for each person, limited to their top six most highly related concepts in the embodiment shown in FIG. 14, allows the searcher to get a sense of both the kind of things in these Profiles that are related to the query and the degree of relatedness of these concepts to the query. To generate this word cloud, techniques for summarizing the relevance of a document to a query described herein may be employed (e.g., in this expertise location use case embodiment, typically for every person approximately 50 concepts are extracted and only the 6 most relevant to the query are displayed). In the case of the first two people this is shown, for example, by "web accessibility" being in a larger font than "input device" or "assistive technology". Third, examining these particular word clouds makes it clear that two quite different kinds of researchers have been returned as potential experts based on two quite different aspects of color blindness. The first cluster includes two people with expertise in "web accessibility" and "low vision", neither of which is exactly the same as color blindness but is conceptually related. It is likely both people would either know a lot about what can be done to accommodate color blindness or would know an expert in this topic. The second cluster includes a researcher with expertise in retinal cells. He too would either know a fair bit about color blindness from the perspective of retinal physiology or would likely know people who do. In an embodiment, the clusters described above are explicitly called out by the user interface. To accomplish this task, the system takes the concept space representation of each document and then employs clustering algorithms (for example k-means) to create document clusters or groups of documents. After obtaining these clusters, the associated documents are displayed in a user interface.

The task of summarizing the most relevant concepts in a document to a query can be accomplished as follows. After a query is input, and a set of documents is returned through the use of the conceptual inverted index, the concepts extracted for these documents are also retrieved. Next, a computation is made to estimate the degree to which the concept or concepts in the query are relevant to each of the extracted concepts for all of the documents returned. This can be achieved by means of the Markov chain techniques described earlier in this invention. Once this estimate is obtained, the concepts within the documents can be ranked, and a desired number of them can be chosen for a word/concept cloud display. The displaying of these concepts can then utilize the relevancy information in order to affect their size on a display, or the color in which they are displayed. In addition, the extracted concepts not only could be displayed in a cloud, they could also be displayed in the context of the text that contains them, by rendering the text and the concepts in differentiating ways.

It may be appreciated that the process described above can be performed done at query time. The problem of summarizing the most relevant concepts in a document to a query may also be done at document ingestion time (essentially at the same time at which the conceptual inverted index is being produced) by storing the contribution of each individual extracted concept from the document to a concept in the concept graph.

An embodiment of this procedure follows. Recall that a document is associated with a conceptual index, which gives the likelihood that a document is relevant for each concept in a concept graph. The way this conceptual index is built is by computing the relevance of each extracted concept in the document to each concept in the concept graph, and then aggregating these numbers into a single number (the aggregation mechanisms are described elsewhere herein). If in addition to the aggregated single number, the individual numbers are also stored, then there is an explanation of how individual extracted concepts in the document are relevant to each concept in the concept graph. This information, which can be regarded as an "explanations index" (e.g., explanations index 114 shown in FIG. 1) can be used to produce the summarized explanations in a user interface the same way the "query time" algorithm described above does. However, note that the size of this possible explanations index is much larger than that of the conceptual index. A way to solve this problem is to store the summary information for a document only for a subset of the concepts in the graph that the document is most relevant to. One way to accomplish this is to sort the likelihoods in a conceptual index for a document and select the concepts that have the top W likelihood values, where W is a parameter that controls the size of this explanations index. After selecting those concepts, explanations can be stored for that document only for the selected concepts. These explanations are then retrieved at query time for the documents for which we want to display a summary. As before, excerpts of text from the document can also be highlighted with the extracted concepts, adding differentiating visual elements to distinguish the ones that are the most relevant to the query.

In the descriptions above, both for the setting where summaries are computed at query time and when summaries are computed at indexing time, the embodiment described showed how to produce summaries for a conceptual query with a single concept. When there are two or more concepts in the query, additional steps described in here need to be taken. The first task is to either compute (when done at query time) or retrieve (when done at indexing time) the information of how each of the concepts in the query relate to each of the extracted documents. After obtaining these independent pieces of information, the information must be merged. Let $c1, c2, \ldots c\_Q$ be the concepts in the conceptual query, let $t1, t2, \ldots t\_E$ be the concepts extracted from the document, and suppose that the information for how relevant $ti$ is for $cj$ is given by some function $f(ti, cj)$ (the function $f(,)$ can be based on Markov chain techniques as described elsewhere herein). At this point, the issue of how relevant an extracted concept $ti$ ($1<=i<=E$) is to the conceptual query $c1, c2, \ldots c\_Q$ is computed by aggregating the data $[f(ti, c1), f(ti, c2), \ldots, f(ti, c\_Q)]$ into a single number. Many aggregation techniques are possible. For example, the minimum of these numbers may be computed. Or the average of these numbers may be computed. Or some transformation may be applied to the numbers before the aggregation; for example, since $f(., .)$ in this embodiment is a likelihood (a probability) then the log likelihood ratio of each number in the list may be computed and then the numbers may be summed; the log likelihood ratio for a likelihood $p$ is given by $\log(p/(1-p))$. At this point, a single number describing how relevant a concept in a document is to a conceptual query is obtained and the rest of the steps follow as described earlier.

Now, suppose that the topic the searcher was in interested in, but had not found a good way to yet express, involved the second, physiological, aspect of color blindness. The interface simplifies the expression of this refined query by allowing any of the terms in the word cloud to be directly clicked and submitted as the concept to search for next.

Figure 14:
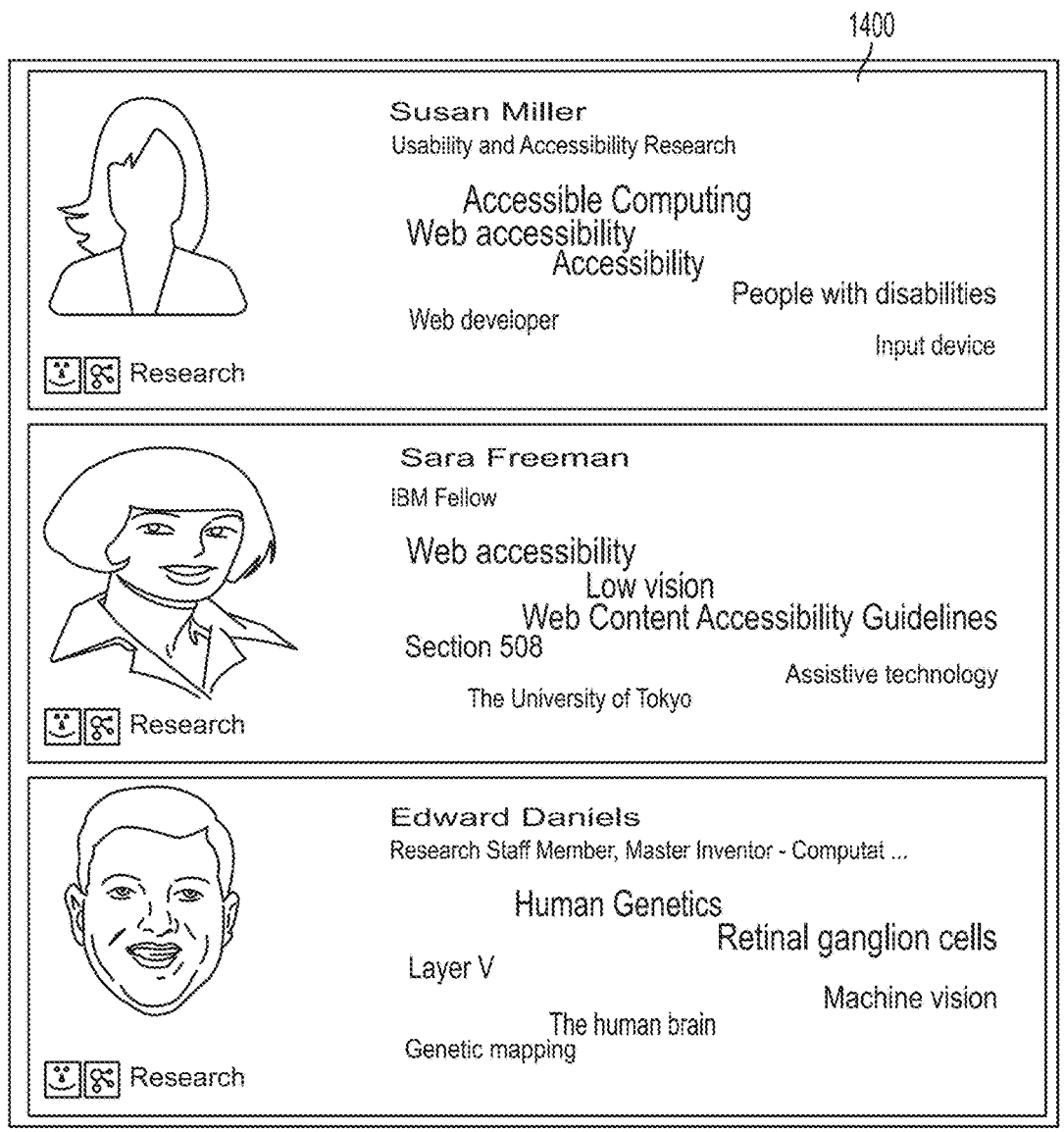
FIG. 14 depicts a user interface for displaying a result set in accordance with an embodiment.
Figure 15:
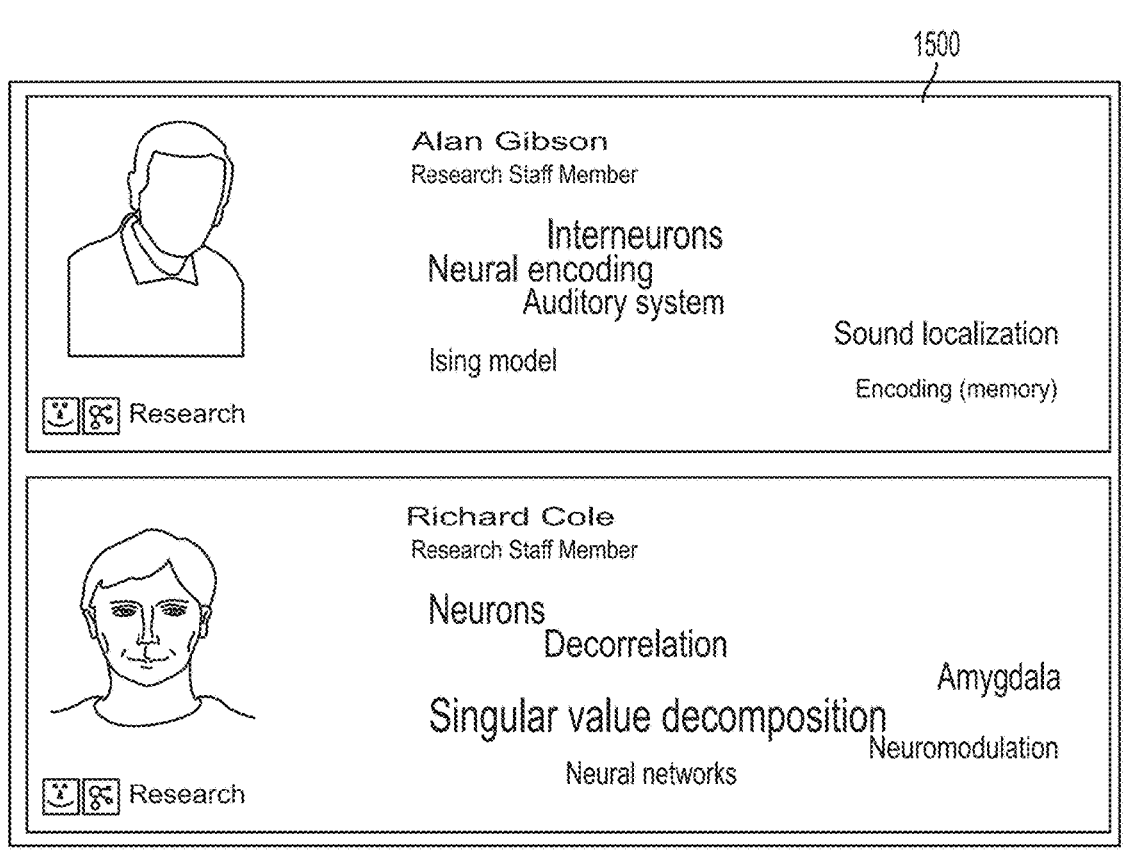
FIG. 15 depicts a user interface for displaying search results in accordance with an embodiment.

FIG. 15 shows a user interface 1500 with portion of the results returned from the action of clicking "retinal ganglion cells" in the word cloud of Edward Daniels in FIG. 14 (Edward, of course, also being returned in these new search results). It is clear that these are people working on different, but potentially related, concepts including "neural encoding" and "neural networks", either of which might be a bit closer to what a searcher is actually trying to find.

Embodiments of the Researcher System ingest and index the externalized content within the Researcher System, including all profiles, secondary pages, and the titles of publications and patents. When content is added or changed, it is automatically indexed within a few minutes of its appearance.

An important aspect of this embodiment of the conceptual indexing system is that the indexing of the corpus of data is assisted by an external data source (e.g., Wikipedia).

This happens in two stages. In the first stage, using the example of Wikipedia, the text generated by a researcher can be automatically linked to articles in Wikipedia in a process that has been previously called "wikification". The resulting links represent a form of machine-extracted knowledge that is the basis for the conceptual indexing technique. There are various published techniques for achieving this stage. In embodiments of the Researcher System, a wikification system is used that parses the content of a researcher's pages and phrases are matched against titles of Wikipedia articles. Terms near the matching phrase are checked against terms in the Wikipedia article and if they have good mutual information a match is registered. This approach to disambiguation has the additional benefit of differentiating between concepts that have the same descriptor (say "design" as shown in the next section) but have quite different meanings.

In the second stage, an internal representation of related concepts can be computed with which the researcher may be familiar. The information retrieval literature provides multiple approaches for estimating this. An embodiment uses a variant of the class of techniques that compute relatedness between a concept and other concepts by computing the number of short link paths between them. For each researcher the concepts found in the first stage are augmented by using closely related concepts based on this metric.

In addition to the conceptual relatedness metric described above, weights can be computed for the individual concepts associated with each researcher. The primary reason is that writing styles vary significantly from researcher to researcher. A secondary reason is that the annotator in the first stage sometimes makes mistakes and thus further denoising is needed. To illustrate the variability in writing styles, it can be noted that the length of the data for each researcher has a tremendous dynamic range, exhibiting a log-normal distribution. The log-normal behavior implies that measuring expertise by simple linear accumulation of evidence is likely to disproportionally favor individuals with very lengthy descriptions. Embodiments of scoring mechanisms do give credit to researchers who have more content, however they also detect the verbosity in a researcher's description in order to adjust scores appropriately.

A fuzzy matching approach as described herein using Wikipedia concepts can be used to increase the likelihood of finding people related to a query. In addition, embodiments can be used to increase the precision of search results.

Figure 16:
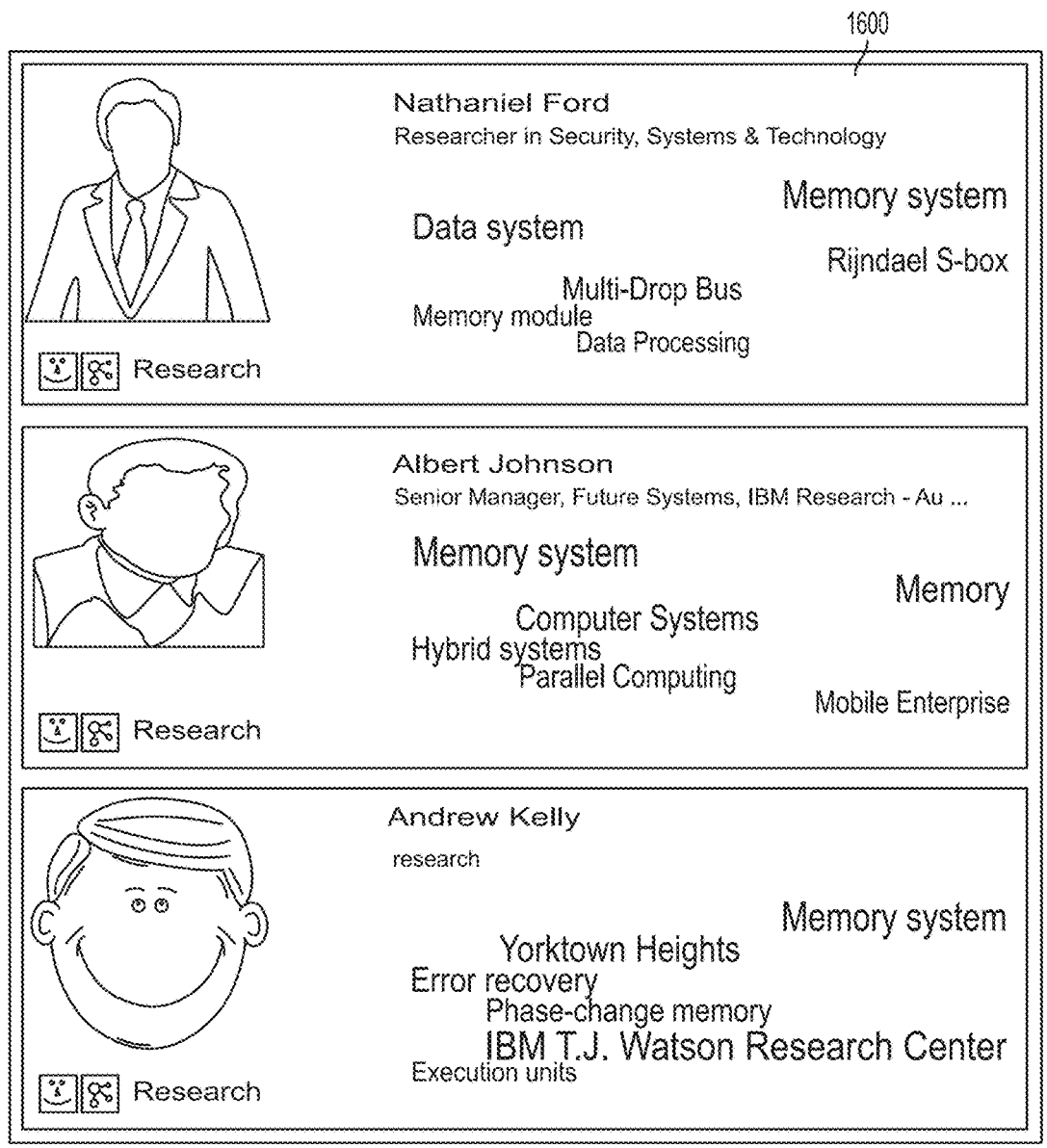
FIG. 16 depicts a user interface for displaying a portion of search results in accordance with an embodiment.

For example, consider a portion of the results returned from a search for people with expertise in "memory systems" as shown in in the embodiment of a user interface 1600 shown in FIG. 16. Examining the publications, shown in the embodiment of a user interface 1700 shown in FIG. 17, of the first person in this set, it can be determined that he has published a paper on the "design" of memory systems and another on "designing" an aspect of a thin client.

Recalling that the system also ingests and indexes the titles of publications it might be assumed that a search for the term "design" would find this researcher. However, this might not be the case.

Figure 18:
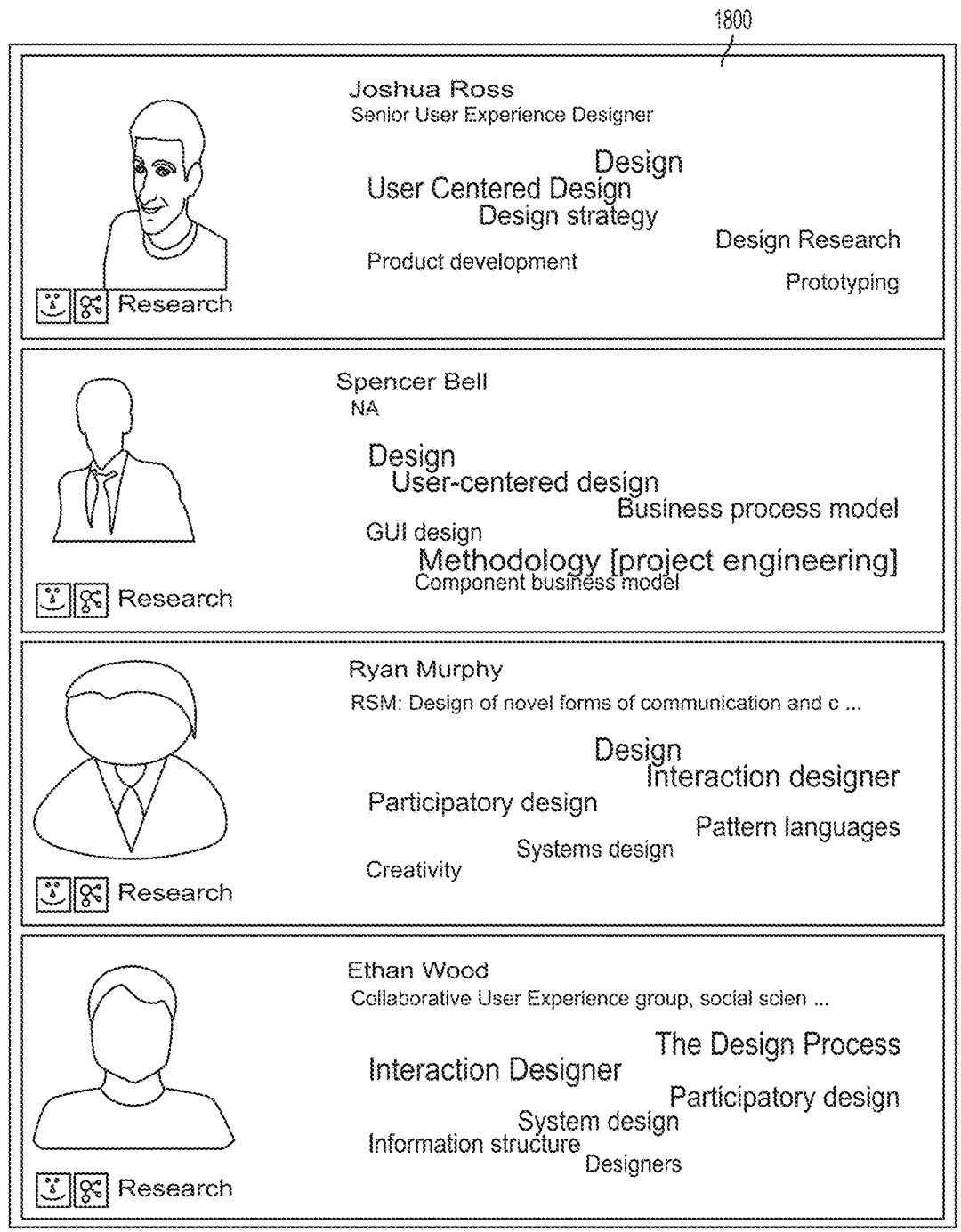
FIG. 18 depicts a user interface for displaying a portion of search results in accordance with an embodiment.

FIG. 18 shows user interface 1800 with a portion of the results that may returned from searching for the concept "design". While different kinds of design-related researchers are returned (with people related to interactive design and design methodologies being near the top), the aspect of design as applied to memory systems and thin clients does not rank as highly. As such, the precision of the search can be increased.

Figure 19:
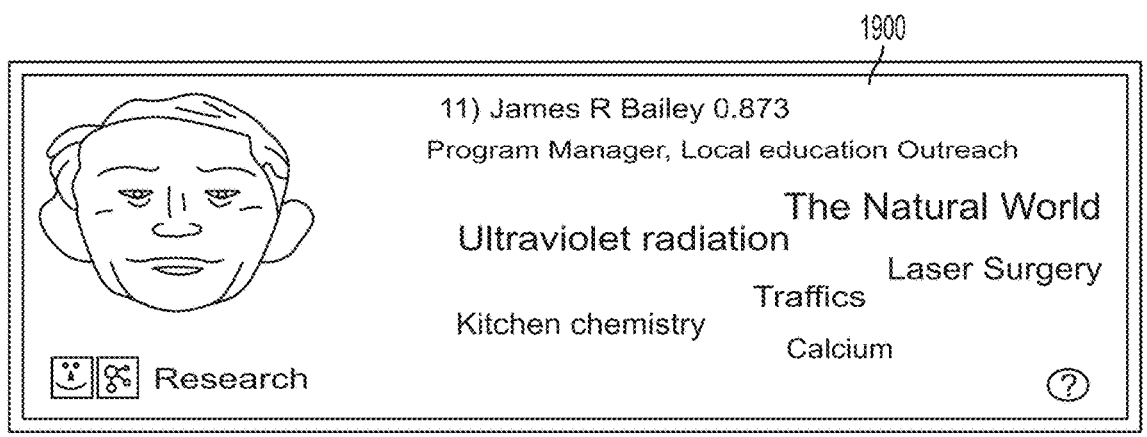
FIG. 19 depicts a user interface for displaying a portion of search results in accordance with an embodiment.

Also included in the results from the search for "color blindness" could be the researcher shown in the user interface 1900 of FIG. 19. He was somewhat further down the ranked list of results, but not so far down as to be effectively invisible. At first glance it may be difficult to figure out why this person was in included in the search results. But by turning on additional diagnostic information (which includes the computed distance metric at the top along with an icon at the bottom allowing evidence to be shown) it can be discovered that that this person was a co-inventor of the laser surgery technique that has come to be known as LASIK. This is clearly something related to abnormal vision but it is arguably too far away from color blindness to make this person a likely expert on that topic.

The system for finding people described in here can be augmented with social networking capabilities. In one embodiment, a mechanism can be added for inputting into a system a "thought" which the system processes as a conceptual query. The documents in the system, as in the expertise finding application, are documents that are representative of a person's interests and/or skills. Therefore, the system is capable of creating a list of people that may be interested in the thought input by assessing the degree to which the thought is relevant to a person. The goal of the system is to enable an interaction between the initiator of the thought to the rest of the community in the system, for example in the form of a chat (discussion) focused on the aforementioned thought. As such, the closeness between the thought and the interests or skills of a person is only one of multiple parameters that are considered in order to select people that may be potentially interested in the discussion. Additional parameters include whether a person is presently logged into the system, whether a person is presently or recently active in the system, whether a person has engaged with discussion requests or not, and the number of discussions in which a person has engaged recently.

An application of this technology for resolving a different problem will now be described. Suppose that it is desirable to build a system for recommending news articles to a reader. Then in the documents that are input to the system, news articles are included, which are then automatically linked to a concept graph by the system. In addition to the article's text, the date in which the article was published is included as a piece of metadata. The end-to-end system as described earlier is applied to this task. A search bar in a newspaper web page or e-reader device allows the user to input queries either by specifying concepts directly or by specifying a string of text. Recommended articles are then returned by the system by looking up the conceptual reverse index as described in this embodiment. In addition, recommended articles may also be given when a user is already reading an article, by analyzing the article, extracting concepts in the article and then finding articles that are close to the article being read in a conceptual sense (as opposed to a text similarity sense, which is a common way to do document similarity analysis). In addition, a navigation facility for news articles may be added by displaying concepts related to articles with hyperlinks, clicking on the hyperlinks results in redoing a conceptual search with the concept that was clicked, and thus displaying new content. The sequence of articles and concepts clicked can then be used to create a user profile to understand what interests the user in a conceptual sense. These concepts can then be used as contextual information to aid further article recommendations even in the absence of any specific query from the user. The lists of articles returned by the system in the various cases described are further re-ranked to account for the date in which the article was written, so that more recent articles receive an increase in their ranking. This provides a hybrid ranking system considering conceptual relevance and recency.

As described herein, a method for summarizing the relevance of a document to a conceptual query can include receiving a conceptual query that includes one or more concepts. Concepts extracted from the document are accessed, and a degree to which the conceptual query is related to each of the extracted concepts is computed (e.g. based on paths in a concept graph connecting the concepts in the conceptual query to each of the extracted concepts). A summary can be created by selecting a threshold number of the concepts having a greatest degree of relation to the conceptual query, and then output (e.g., to a user interface). The summary can include excerpts of text from documents highlighting extracted concepts that have a degree of relevance to the conceptual query. In embodiment, any concept that also formed part of the conceptual query is not displayed by a user interface. Each of the concepts in the summary can be associated with a hyperlink and based on a user selecting the hyperlink, a new list of summaries related to the concept in the hyperlink can be output. A relevance of an extracted concept to a conceptual query can be summarized by at least one of changing a font size of the extracted concept and changing a color of the extracted concept.

In an embodiment, a least one concept in the summary is not a concept in the conceptual query. The computing the degree of relation can include iterating a Markov chain derived from the concept graph. The computing can be performed at indexing time for conceptual queries comprised of a single concept, and at least a subset of the results of the computing stored in an explanations index. Creating the summaries can include retrieving the explanations index. The conceptual query can include two or more concepts and creating a summary can be responsive to a degree of relation between each of the concepts in the conceptual query and each of the extracted concepts.

As described herein, an embodiment for summarizing the relevance of documents to a conceptual query can include: receiving the conceptual query; accessing extracted concepts for each of the documents; computing a degree to which each of the documents are related to one another (e.g., as part of a clustering algorithm), the computing responsive to paths in the concept graph connecting the extracted concepts in one document to extracted concepts in another document; assigning the documents to one or more groups based on the computing, wherein a pair of documents having a first score that specifies a degree of relation are more likely to be in the same group than a pair of documents having a second score specifying a degree of relation that is lower than the first score; and outputting results of the assigning.

Figure 20:
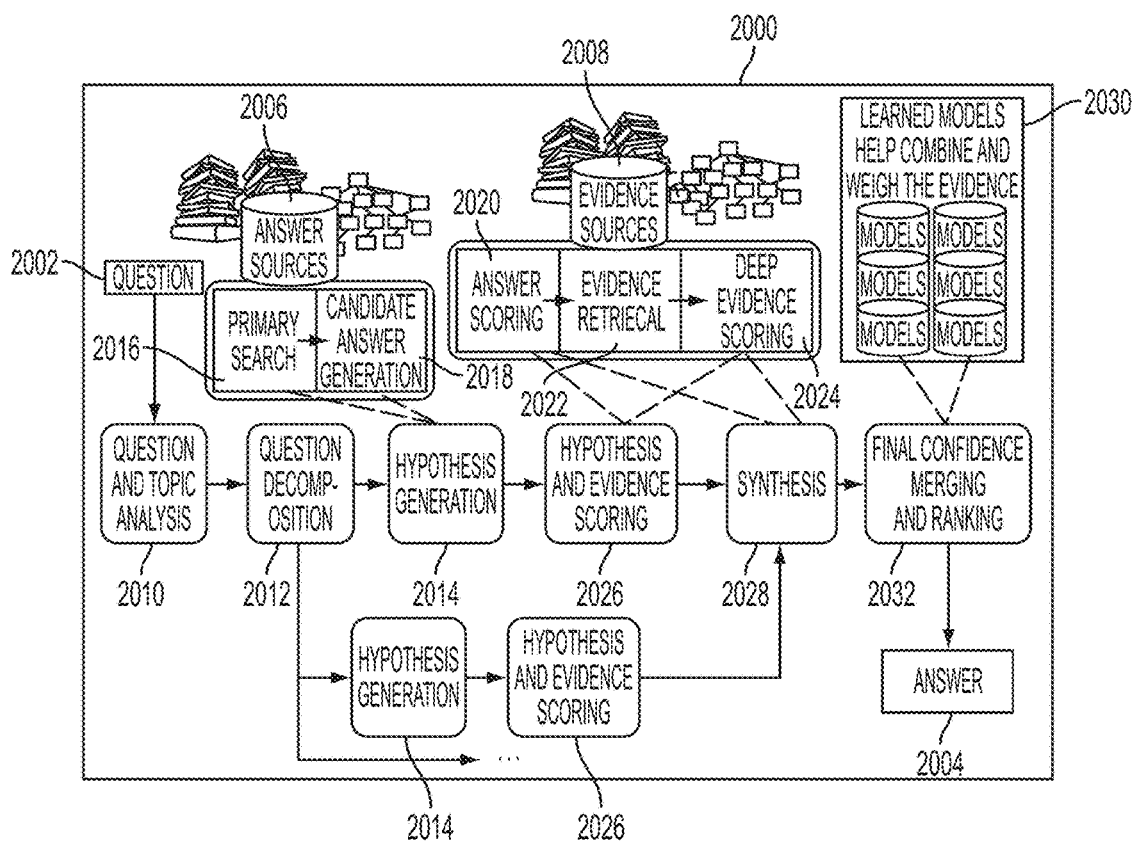
FIG. 20 depicts a high-level block diagram of a question-answer (QA) framework where embodiments of semantic searching can be implemented in accordance with an embodiment.

Turning now to FIG. 20, a high-level block diagram of a question-answer (QA) framework 2000 where embodiments described herein can be utilized is generally shown.

The QA framework 2000 can be implemented to generate an answer 2004 (and a confidence level associated with the answer) to a given question 2002. In an embodiment, general principles implemented by the framework 2000 to generate answers 2004 to questions 2002 include massive parallelism, the use of many experts, pervasive confidence estimation, and the integration of shallow and deep knowledge. In an embodiment, the QA framework 2000 shown in FIG. 20 is implemented by the Watson™ product from IBM.

The QA framework 2000 shown in FIG. 20 defines various stages of analysis in a processing pipeline. In an embodiment, each stage admits multiple implementations that can produce alternative results. At each stage, alternatives can be independently pursued as part of a massively parallel computation. Embodiments of the framework 2000 don't assume that any component perfectly understands the question 2002 and can just look up the right answer 2004 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 20, the question and topic analysis 2010 is performed and used in question decomposition 2012. Hypotheses are generated by the hypothesis generation block 2014 which uses input from the question decomposition 2012, as well data obtained via a primary search 2016 through the answer sources 2006 and candidate answer generation 2018 to generate several hypotheses. Hypothesis and evidence scoring 2026 is then performed for each hypothesis using evidence sources 2008 and can include answer scoring 2020, evidence retrieval 2022 and deep evidence scoring 2024.

A synthesis 2028 is performed of the results of the multiple hypothesis and evidence scorings 2026. Input to the synthesis 2028 can include answer scoring 2020, evidence retrieval 2022, and deep evidence scoring 2024. Learned models 2030 can then be applied to the results of the synthesis 2028 to generate a final confidence merging and ranking 2032. An answer 2004 (and a confidence level associated with the answer) is then output.

Semantic analytics play a key role in information extraction by the QA framework 2000 shown in FIG. 20. Embodiments of the concept-driven analytics disclosed herein can be utilized by the QA framework 2000 to provide relevant search and recommendation results, as well providing rich document exploration capabilities. A document (e.g., as question 2002) can be processed for concept extraction (e.g., analysis 2010, decomposition 2012), and the extracted concepts may be used to determine relationships against a concept space (e.g., answer sources 2006). Factors, such as the number of paths between concepts, as well as the length of the paths thereof, can be used by the scoring mechanism 2020, to determine these relationships, and generate corresponding answers 2004. In one embodiment, patterns of associations or relationships for a given concept or group of concepts may be collected over time and stored, e.g., as models 2030, which are applied to subsequently derived extracted concepts.

Figure 21:
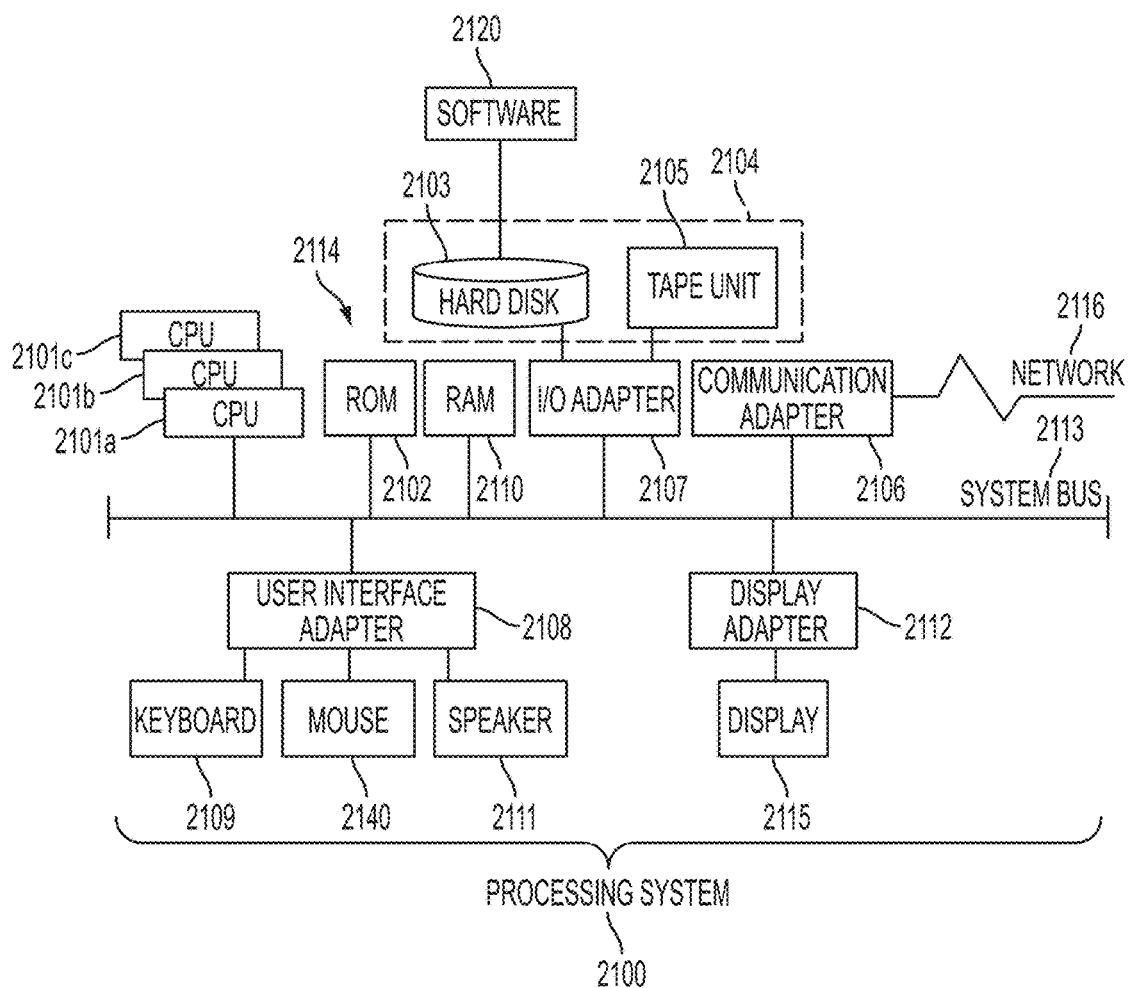
FIG. 21 depicts a processing system for performing semantic searching in accordance with an embodiment.

Referring now to FIG. 21, there is shown an embodiment of a processing system 2100 for implementing the teachings, including performing the processes (including the Researcher System), described herein. In this embodiment, the processing system 2100 has one or more central processing units (processors) 2101a, 2101b, 2101c, etc. (collectively or generically referred to as processor(s) 2101). Processors 2101 are coupled to system memory 2114 and various other components via a system bus 2113. Read only memory (ROM) 2102 is coupled to system bus 2113 and may include a basic input/output system (BIOS), which controls certain basic functions of the processing system 2100. The system memory 2114 can include ROM 2102 and random access memory (RAM) 2110, which is read-write memory coupled to system bus 2113 for use by processors 2101.

FIG. 21 further depicts an input/output (I/O) adapter 2107 and a network adapter 2106 coupled to the system bus 2113. I/O adapter 2107 may be a small computer system interface (SCSI) adapter that communicates with a hard disk 2103 and/or tape storage drive 2105 or any other similar component. I/O adapter 2107, hard disk 2103, and tape storage drive 2105 are collectively referred to herein as mass storage 2104. Software 2120 for execution on processing system 2100 may be stored in mass storage Y2104. Network adapter 2106 interconnects system bus 2113 with an outside network 2116 enabling processing system 2100 to communicate with other such systems. A screen (e.g., a display monitor) 2115 is connected to system bus 2113 by display adapter 2112, which may include a graphics controller to improve the performance of graphics intensive applications and a video controller. In one embodiment, adapters 2107, 2106, and 2112 may be connected to one or more I/O buses that are connected to system bus 2113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 2113 via user interface adapter 2108 and display adapter 2112. A keyboard 2109, mouse 2140, and speaker 2111 can be interconnected to system bus 2113 via user interface adapter 2108, which may include, for example, a Super I/O chip integrating multiple device adapters into a single integrated circuit.

Thus, as configured in FIG. 21, processing system 2100 includes processing capability in the form of processors 2101, and, storage capability including system memory 2114 and mass storage 2104, input means such as keyboard 2109 and mouse 2140, and output capability including speaker 2111 and display 2115. In one embodiment, a portion of system memory 2114 and mass storage 2104 collectively store an operating system such as the AIX® operating system from IBM Corporation to coordinate the functions of the various components shown in FIG. 21.

Technical effects and benefits include the capability of analyzing documents conceptually instead of simply at the level of text matching, and using the result of this analysis to provide for more relevant search and recommendation results, as well providing for a rich document exploration capability.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically linking text to concepts in a knowledge base, the method comprising:
    receiving, at a computer system, a plurality of text strings;
    building a conceptual index that links the text strings to the knowledge base, the building comprising for each of the text strings:
        creating an entry in the conceptual index that includes a link between the text string and one of the concepts in the knowledge base, the creating based at least in part on a link confidence score of the concept being more than a first threshold value away from a prescribed threshold;
    generating a conceptual inverted index based on entries in the conceptual index, each entry of the conceptual inverted index corresponding to a different one of the concepts in the knowledge base and comprising pointers to at least a subset of text strings of the plurality of text strings linked to the concept in the conceptual index;
    receiving a query from an agent external to the computer system, the query specifying a concept in the knowledge base; and
    processing the query by the computer system, the processing comprising searching the conceptual inverted index for the concept specified in the query and returning a pointer to a text string in an entry of the conceptual inverted index corresponding to the concept.

2. The method of claim 1, further comprising:
    selecting a plurality of data sources that correspond to at least a subset of the concepts in the knowledge base, the selecting based on contents of the text string; and
    calculating link confidence scores for each of the concepts based on a differential analysis of a probability that the text string is output by a language model built using a data source of the plurality of data sources and a probability that the text string is output by a generic language model that is not related to any particular concept in the knowledge base.

3. The method of claim 2, further comprising for each of text strings:
    calculating, for each of the selected data sources, the probability that the text string is output by a language model built using the selected data source.

4. The method of claim 2 further comprising for each of the text strings:
    calculating the probability that the text string is output by a generic language model that is not related to any particular concept in the knowledge base.

5. The method of claim 2, wherein the differential analysis compares at least one of:
    the probability that the text string is output by a language model built using a data source of the plurality of data sources to the probability that the text string is output by the generic language model; and
    the probability that the text string is output by a language model built using a data source of the plurality of data sources to a probability that the text string is output by a language model built using a competing data source.

6. The method of claim 2, wherein the generic language model is derived from a generic data source not specific to any of the concepts in the knowledge base.

7. The method of claim 1, wherein the text string is linked to a second one of the concepts in the knowledge base.

8. The method of claim 1, wherein the link applies to a subset of the text string and the subset is indicated in the link, and words in the subset are not consecutive in the text string.

9. The method of claim 1, wherein each of the plurality of text strings corresponds to a person and includes a description of their skills, and each of the concepts in the knowledge base is an area of expertise, wherein the query result provides the external agent with a list of possible people having a specified area of expertise.

10. The method of claim 1, wherein each of the text strings have a version number and the method further comprises periodically, by a garbage collection mechanism, deleting links in the conceptual index to text strings having invalid version numbers.

\* \* \* \* \*